United States Patent
Olivier et al.

(10) Patent No.: US 12,130,396 B2
(45) Date of Patent: Oct. 29, 2024

(54) NEUTRALLY BUOYANT PARTICLE VELOCITY SENSOR

(71) Applicant: Exion, LLC, Houston, TX (US)

(72) Inventors: Andre' W. Olivier, River Ridge, LA (US); Ronald K. Barry, Harahan, LA (US); Nikolaos Bernitsas, Sugar Land, TX (US)

(73) Assignee: EXION TECHNOLOGIES CORP., Houston, TX (US)

( * ) Notice: Subject to any disclaimer, the term of this patent is extended or adjusted under 35 U.S.C. 154(b) by 356 days.

(21) Appl. No.: 17/487,206

(22) Filed: Sep. 28, 2021

(65) Prior Publication Data

US 2022/0120927 A1    Apr. 21, 2022

Related U.S. Application Data

(60) Provisional application No. 63/092,225, filed on Oct. 15, 2020.

(51) Int. Cl.
*G01V 1/38* (2006.01)

(52) U.S. Cl.
CPC .......... *G01V 1/3808* (2013.01); *G01V 1/3817* (2013.01); *G01V 2210/1423* (2013.01); *G01V 2210/56* (2013.01)

(58) Field of Classification Search
CPC ............... G01V 1/3808; G01V 1/3817; G01V 2210/1423; G01V 2210/56
See application file for complete search history.

(56) References Cited

U.S. PATENT DOCUMENTS

| | | | |
|---|---|---|---|
| 5,432,750 A * | 7/1995 | Ream, Jr. ............. | G10K 11/008 367/4 |
| 9,651,374 B1 * | 5/2017 | Wingo .................... | B63B 22/06 |
| 2005/0052951 A1 | 3/2005 | Ray et al. | |
| 2005/0098377 A1 | 5/2005 | Bary et al. | |
| 2006/0201243 A1 | 9/2006 | Auffret et al. | |
| 2013/0083622 A1 | 4/2013 | Herrmann et al. | |
| 2013/0163374 A1 * | 6/2013 | Herrmann ............ | G01V 1/3852 367/20 |
| 2016/0202380 A1 * | 7/2016 | Olivier ................. | G01V 1/3852 367/15 |

(Continued)

OTHER PUBLICATIONS

PCT, Invitation to Pay Additional Fees and, Where Applicable, Protest Fee for Application PCT/US2021/051336 dated Dec. 23, 2021.

(Continued)

*Primary Examiner* — Krystine E Breier
(74) *Attorney, Agent, or Firm* — Patterson + Sheridan, LLP

(57) ABSTRACT

An autonomous sensor node for undersea seismic surveying is formed as a sphere with density similar to sea water in order to minimize effects of noise. The node is capable of measuring both seismic pressure waves and water-borne particle velocity in three dimensions. The node floats above the seafloor to greatly decrease the impact of shear wave noise contamination generated by seabed waves. The node is attached to an anchor resting on the seabed by a tether. The tether is configured to prevent transfer of any tensile forces caused by shear waves in the seabed stratum from the anchor to the node. The tether may have a varying density along its length to entirely attenuate any force transfer from the seafloor.

28 Claims, 11 Drawing Sheets

(56) References Cited

U.S. PATENT DOCUMENTS

2019/0017860 A1* 1/2019 Hogdahl ............. G01F 23/0023

OTHER PUBLICATIONS

PCT, Notification of Transmittal of The International Search Report and The Written Opinion of The International Searching Authority, or The Declaration for Application PCT/US2021/051336 dated Feb. 14, 2022.

* cited by examiner

NEUTRALLY BUOYANT PARTICLE VELOCITY SENSOR

CROSS REFERENCE TO RELATED APPLICATIONS

This application claims the benefit of U.S. provisional application No. 63/092,225 entitled "Neutrally Buoyant Particle Velocity Sensor," which was filed on Oct. 15, 2020, and which is hereby incorporated by reference, in its entirety for all purposes.

TECHNICAL FIELD

This application relates generally to particle velocity sensors for use in underwater environments. In exemplary implementations, the technology may be incorporated into seismic data acquisition and sensor systems for marine seismic surveys, including, but not limited to, ocean bottom cables and seismic node applications.

BACKGROUND

Seismic survey technologies are commonly used to explore and develop resources for the petrochemical industry. Petrochemical products are ubiquitous in the modern economy, and may be found in everything from oil and gasoline to medical devices, children's toys, and a wide range of other everyday household items. To meet the continuing demand for these products, oil and gas reserves must be accurately located and surveyed, so that these important resources can be effectively managed. As a result, there is an ongoing need for new seismic sensor systems and more advanced exploration technologies.

Scientists and engineers typically utilize seismic wave-based exploration techniques to locate new oil and gas reservoirs, and to survey and manage existing reserves over time. Seismic surveys are performed by deploying an array of seismic sensors or receivers over the region of interest and by monitoring the reception of energy reflections in response to controlled emissions of seismic energy via seismic sources such as vibrators, air gun arrays, or explosive detonations. The response depends upon the seismic energy reflected from subsurface structures, allowing the corresponding geological features to be imaged, including mineral reservoirs and other underground structures of interest.

Marine seismic surveys may proceed by towing an array of seismic energy sources behind a survey vessel. An array of air guns or other seismic sources is used to generate seismic energy that propagates down through the water column to the ocean floor (or other bottom surface). A portion of the seismic source energy penetrates the ocean floor and is reflected from subsurface structures, then returns back to the ocean bottom and propagates through the water column to be detected by receiver sensors. In some implementations, a streamer array, i.e., receiving sensors attached to cables submerged shallowly in the water and pulled behind the same or another survey vessel, receive and record the reflected seismic energy. Seismic receivers can also be disposed along ocean-bottom cables or can be provided in the form of individual, autonomous seismic nodes distributed on the seabed.

Typical seismic receivers include pressure sensors and particle motion detectors, which can be provided as individual sensor components, or combined together with both sensor types located in close proximity within a receiver module or seismic node. For example, a plurality of pressure sensors, e.g., hydrophones, can be configured in an array of sensor nodes either pulled behind a vessel along streamer cables or arranged on the ocean bottom. The pressure sensors are adapted to record scalar pressure measurements of the seismic wavefield propagating through the water column or other seismic medium. Particle motion sensors (e.g., geophones and accelerometers) may further be configured to provide single-axis or three-dimensional vector velocity measurements (either directly in the case of geophones or indirectly in the case of accelerometers, wherein the acceleration measurements are converted into vector velocities) to characterize motion of the sensor in response to propagating seismic waves through which a determination of direction of the propagating waves can be made.

Geophysical data pertaining to the subsurface structures is acquired by observing the reflected seismic energy with an array of such receiver components. The observed seismic signals are used to generate a seismic image that describes the subsurface geology and composition in and around the survey area. The overall image quality depends not only on signal sensitivity but also on noise effects, contributing to the constant demand for more advanced sensor and receiver technologies.

Particle motion or particle velocity sensors are subject to significant noise and interference. For example, particle motion sensors trailing behind a vessel near the surface are subject to the forces on the cable pulling the sensor through the water behind a vessel as well as movement caused by waves and currents. Likewise, particle velocity sensors mounted in ocean bottom seismic nodes are sensitive to shear forces that travel through the subfloor strata and impact the node sitting on the seafloor. Some attempts have been made to float an ocean bottom node slightly above the seafloor to mitigate the impact of shear forces on the node as shear forces do not travel through the water. However, the node must still be attached to some form of seafloor anchor to maintain its position, e.g., by a tether. Unfortunately, the subfloor shear forces still propagate through the tether or other attachment mechanism and are recorded by the accelerometers in the node that provide waterborne particle velocity measurements. This noise must be mathematically removed from the recorded signals in order to identify the propagation direction and speed with any accuracy. Even with noise filtering the accuracy of particle velocity readings is significantly diminished due to the similar magnitudes of the shear waves and the acoustic waves passing through the water column.

The information included in this Background section of the specification, including any references cited herein and any description or discussion thereof, is included for technical reference purposes only and is not to be regarded subject matter by which the scope of the invention as defined in the claims is to be bound.

SUMMARY

The technology disclosed herein is directed to an autonomous sensor node for undersea seismic surveying. The sensor node may be formed as a sphere with density similar to sea water in order to minimize effects of noise on the sensor node. The sensor node may be capable of sensing and recording both seismic pressure waves and water-borne particle velocity in three dimensions. With a buoyancy neutral to its environment, e.g., seawater, the spherical sensor node may be configured to float above, rather than rest upon, the seafloor. As previously noted, water is incapable of transmitting shear that is transferred through the strata. The neutral buoyancy of the floating sensor node greatly decreases the impact of shear wave noise contamination generated by seabed waves. The sensor node may be attached to an anchor resting on the seabed by a tether to maintain the position of the sensor node for the purposes of the seismic survey.

In order to completely isolate the neutrally buoyant spherical sensor node, the tether is configured to prevent the transfer of any tensile forces caused by shear waves in the seabed strata along the tether to the sensor node. Similarly, the tether is designed to prevent the transfer of any forces acting on the sensor node to the seafloor. In some implementations, the tether has a varying density along its length, which is configured to entirely attenuate any force transfer from the seafloor to the sensor and vice versa. In some implementations, a portion of the tether is factored into the mass and center of gravity of the sensor node to maintain the center of gravity of the sensor node at the center of the spherical shape even when attached to the tether.

The sensor node may have various configurations and types of sensors. In one embodiment, the sensor node may include only a single sensor (1 channel) capable of detecting pressure waves (P waves) only (e.g., a hydrophone). In another embodiment, the sensor node may include a P-wave sensor (e.g., a hydrophone) and a particle velocity sensor (e.g., a 3-axis translational accelerometer). This implementation is consider a 4-channel configuration and may be capable of ghost rejection and wave field interpolation. In a further embodiment, the sensor node may have 10 channels by further including a 3-axis angular accelerometer, a 2-axis tilt sensor, and a compass. In an alternative 10 channel embodiment, the sensor node may include a hydrophone as a P-wave sensor; a 6-channel, single-mass accelerometer capable of taking measurements free of shear (by direct measurement of the shear-induced contamination and removal thereof); two inclinometers; and a compass.

In some implementations, an array of neutrally buoyant sensor nodes may be attached to a single cable and spaced apart from each other at equal or varying distances by design depending upon the nature and need of the survey. The sensor nodes may be attached to the cable by tethers rather than directly to allow for the neutrally buoyant sensor nodes to float above the seafloor. Anchor weights may be provided at the attachment locations on the cable to ensure the sensor nodes are stationary at the desired positions on the seafloor. Significant operational efficiency may be gained by dragging such an array along the seafloor to relocate the nodes from one location to another. Deployment and retrieval efficiency gains are also realized as the nodes can be attached to a cable and payed out behind a vessel and also pulled aboard a vessel by winding up the cable and detaching the nodes as they are pulled aboard.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

BRIEF DESCRIPTION OF THE DRAWINGS

The disclosure will be readily understood by considering the following detailed description in conjunction with the accompanying drawings described below, wherein like reference numerals designate like structural elements.

Figure 1A:
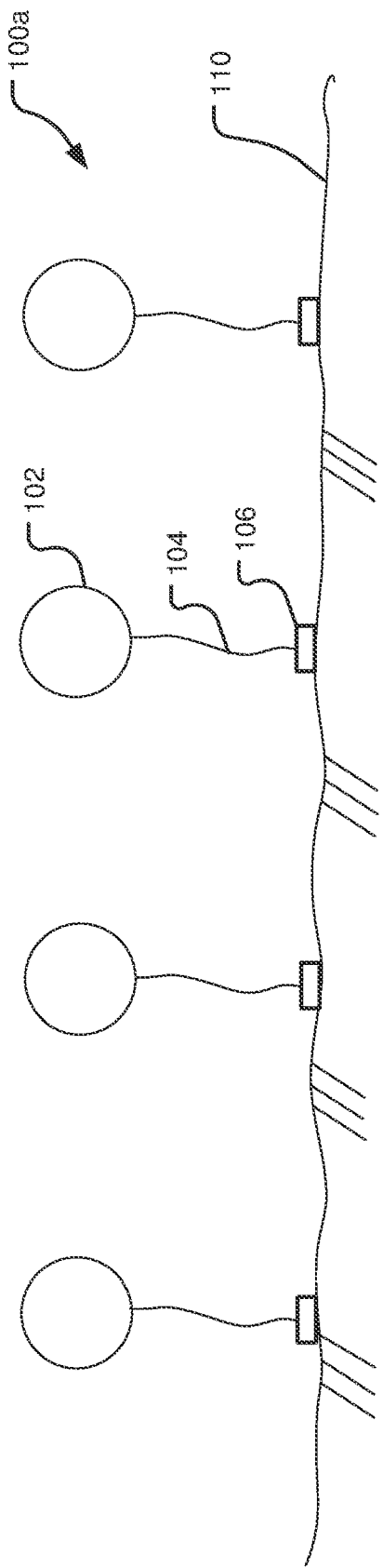
FIG. 1A is a schematic diagram of an array of autonomous spherical seismic sensor nodes tethered to weighted anchors positioned on the seafloor.

The use of cross-hatching in the accompanying figures is generally provided to clarify the boundaries between adjacent elements, e.g., when shown in cross section. The use of shading is generally provided to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

As discussed above, the technology disclosed herein relates to the design of seismic sensor nodes for deployment in the ocean. The sensor nodes are capable of sensing and recording both seismic pressure waves and water-borne particle velocity in three or more dimensions. The seismic pressure waves are generated at or near the ocean surface as sound waves that travel through the seawater and penetrate the seafloor. Upon encountering subfloor structures of differing densities (e.g., deposits of petroleum or gas), sound waves reflected from such structures will have different properties from the original sound waves. The sound waves reflected back through the seawater are the seismic pressure waves (P waves), which may be measured and recorded by a hydrophone on the sensor node. (A hydrophone is a microphone designed to sense sound waves propagating in water rather than in air.) However, due to the long wavelengths and short frequencies (typically between 1 Hz-250 Hz) of the sound waves used for seismic exploration, the pressure waves are not directional, i.e., it is impossible to determine the direction of travel or origin of the reflected sounds directly from the hydrophone sensors, only the frequency and magnitude of the waves.

Particle velocity may be defined as the velocity of a particle (real or imagined) in a medium as the medium transmits a wave. In the construct of a seismic sensor deployed in the ocean, the particle is an imaginary particle (e.g., a "drop" of water) in a medium of water (i.e., seawater in the ocean). In this case the medium, the seawater, transmits a longitudinal sound wave as pressure reflecting from sub-sea floor structures. Thus, the particle velocity to be detected by a submerged seismic sensor is the physical speed of a drop of water as it moves back and forth (i.e., oscillates) in a direction parallel to the direction of the sound wave as it passes. Notably, particle velocity is not the speed of the sound wave as it passes through the medium (i.e., particle velocity is not the same as the speed of sound). The sound wave moves quickly through the medium, while the "particles" oscillate about their original position with a relatively small particle velocity.

In applications involving sound, an array of pressure sensors (microphones or hydrophones) are usually used to measure sound pressure which is then translated into an approximation of a particle velocity field using mathematical functions. In this way, a direction of travel of sound waves reflecting from sub-surface structures can be approximated and thus their origin and the location of the sub-surface structure of potential interest. In contrast, at least one goal of the technology disclosed herein is to directly measure particle velocity in the seismic medium, i.e., the seawater, rather than extrapolating from measurement of the sound waves.

As described in various exemplary embodiments herein, an autonomous sensor node is constructed to have a density similar to the medium in which it is to be deployed, for example, sea water. Thus, the sensor node is neutrally buoyant. As used herein, "neutrally buoyant" can mean the sensor node has some slight buoyancy in the medium (e.g., saltwater). That is, the sensor node can have some positive buoyancy, but nonetheless the density of the sensor node is set so the buoyancy is close to being neutral in order to minimize a tension the sensor node causes on a tether. In one embodiment, the density of the sensor node (and its resulting buoyancy) is set so there is at least one point in the tether where there is no tension, which is described in more detail in FIG. 4.

The sensor node may further include a first sensor capable of sensing seismic pressure waves (e.g., a hydrophone) and a second sensor capable of sensing water borne particle velocity in three dimensions (e.g., a mass accelerometer as further described herein). The sensor node may further include processing circuitry, a power source, and memory to store the sensed pressure and particle velocity information. In one embodiment, all of these components are arranged in the sensor node to ensure that the center of gravity of the sensor node is in the geometric center of the sensor node and that the overall density of the sensor node is congruent with the medium in which the sensor is deployed. In addition, the sensor node may be shaped as a sphere in order to ensure that the center of mass is geometrically centered within the sensor node and further to ensure uniform response of the sensor node regardless of direction of incidence of pressure waves.

FIG. 1A depicts an array 100a of spherical sensor nodes 102 arranged adjacent to the seafloor 110. Each of the sensor nodes 102 is individually deployed and independent of the other sensor nodes 102 in the array 100a. The sensor nodes 102 may be deployed by dropping them overboard from a vessel if the water is relatively shallow or by placing them with underwater remotely operated vehicles (ROV) if the deployment depth is deep (e.g., hundreds or thousands of feet). The sensor nodes 102 may be connected to negatively buoyant ocean bottom anchors 106 that sit on or embed in the seafloor 110 by cable or rope tethers 104. The anchors 106 may be, for example, steel ballasts of sufficient size and mass to keep the sensor node 102 in place, for example, in the event a current or a sea creature were to interfere with the sensor node 102. As noted, the sensor nodes 102 are designed to be neutrally buoyant. Thus, the sensor nodes 102 are sensitive to any localized disturbance and could move out of a desired position in the array if not held in place by the tether 104. In one embodiment, the anchor 106 can be attached to, or be part of, an unmanned underwater vehicle (UUV) which carries the sensor node 102 to the seafloor 110. The UUV can rest on the seafloor 110 while the sensor node 102 performs its part in a seismic survey and then carries the sensor node 102 to the surface once the seismic survey is complete.

Figure 1B:
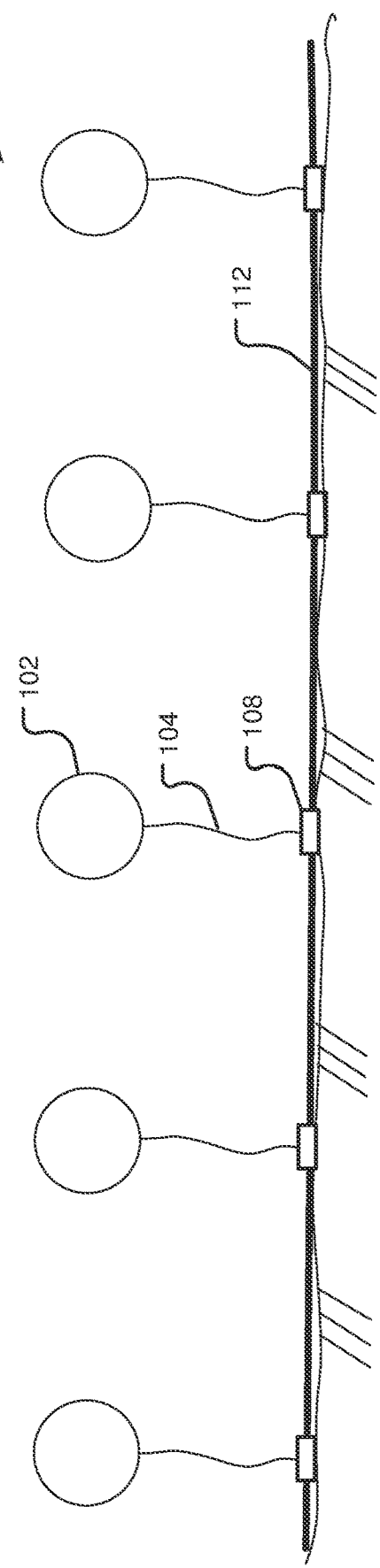
FIG. 1B is a schematic diagram of an array of autonomous, spherical, neutrally buoyant, seismic sensor nodes tethered to weighted anchors attached to a cable positioned on the seafloor.

In another exemplary embodiment depicted in FIG. 1B, a series 100b of sensor nodes 102 may be deployed on the seafloor 110 by attachment to a negatively buoyant cable 112. The cable 112 may be in the form of a steel wire rope typically 1.27 cm (0.5 in.) in diameter. The sensor nodes 102 may be connected to the cable by tethers 104 at spaced locations along the cable 112. The spacing of the sensor nodes 102 along the cable 112 may be uniform as shown in FIG. 1B or the spacing may be variable depending upon the desired positions for sensor nodes 102 in a seismic survey array. The tethers 104 may be attached to the cable 112 by clamps 108 at desired locations along the cable 112. The clamps 108 may also function as anchors to provide additional negative ballast to the cable 112 and provide a more substantial interface with the seafloor 110 to resist movement of the series 100b of sensor nodes 102.

Figure 2:
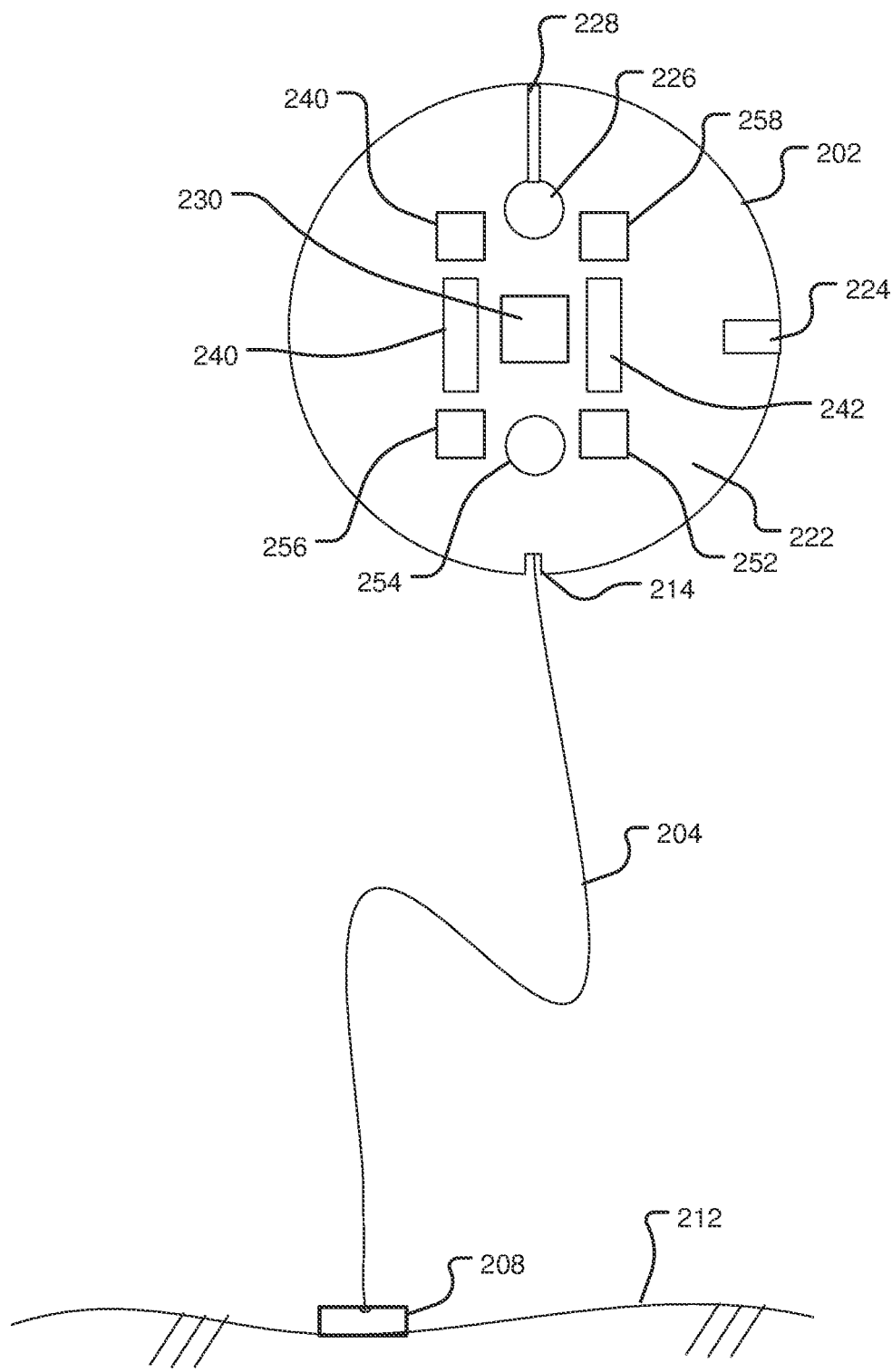
FIG. 2 is a schematic diagram of an embodiment of a single spherical, neutrally buoyant, seismic sensor node tethered to a weighted anchor positioned on the seafloor and indicating a number of components contained therein.

A schematic representation of exemplary components of a sensor node 202 according to the purposes of this disclosure is depicted in FIG. 2. The sensor node 202 may be neutrally buoyant within and with respect to a surrounding medium (e.g., seawater) and may be attached to an anchor 208 on the seafloor 210 by a tether 204. The tether 204 may connect to the sensor node 202 at a base of the sensor node 202 via a spliced or inline universal swivel joint connection 214 that allows free and frictionless 360 degree rotation of the sensor node 202 with respect to the tether 204 to minimize impartation of any rotational forces transmitted from the tether 204 to the sensor node 202 or dampening of any forces incident on the sensor node 202 by the connection with the tether 204. Similarly, the opposite end of the tether 204 may connect to the anchor 208 via a spliced or inline universal swivel joint connection 214. In one embodiment, the goal of the connection 214 is to avoid components such as shackles, pins, clevises, or other connectors that would induce torque on the sensor node 202. That is, any connection scheme should be torque- or twist-free. For example, the connection between the tether 204 and the universal swivel joint connection 214 can be made with a cylindrical, helically wound braid (e.g., a "finger trap" type braid).

The neutral buoyancy and the spherical shape of the sensor node 202 are important to its functionality as a particle velocity sensor. An ideal particle wave follower should match the density of the wave medium in order to move in concert with the medium as the wave travels through. It has been shown that if a uniform, rigid sphere of neutral buoyancy is placed in a low-frequency underwater sound field, the velocity of the sphere is the same as the particle velocity of the water at the same location when the sphere is removed. Thus, in addition to neutral buoyancy of the sensor node 202 as a whole, in one embodiment, the density of the sensor node is as uniform as possible and the center of gravity is centered within the spherical shape such that the center of buoyancy and the center of mass are coincident. In addition, an ideal particle wave follower should only translate and not rotate since rotational energy can be a source of noise. Spherical objects with the center of mass located at the physical center will only translate when pure translational inputs are applied. This is not true for all other shapes, but may be true for other shapes besides a sphere. As such, the embodiments herein are not limited to sensor nodes formed as perfect spheres. Instead, "spherical sensor nodes" or "spherical objects" can include perfect spheres as well as other shapes that have similar behavior as an ideal particle wave follower like a sphere. Other suitable shapes of the spherical sensor nodes can be a truncated icosahedron (e.g., like a soccer ball), a spherical object where a portion of its surface is curved and other portions include one or more planar surfaces, or a spheroid with an elliptical cross section. Thus, as used herein, "spherical" can include other shapes besides a perfect sphere. Further, the product of inertia (POI) of a spherical homogeneous object is zero. Objects having a non-zero POI wobble. Therefore, it is important for noise minimization to design the sensor node 202 to be as homogenous as possible and further to balance areas of higher density mass about the center of the sensor node 202. Rotation of the sensor node 202 about any axis will introduce additional noise into the measurements.

In one exemplary implementation for ocean mediums, the body 222 (e.g., a spherical body) of the spherical node 202 is made substantially from injected molded polyurethane, which can be formed at a density substantially the same as seawater. Polyurethane is neutral, corrosion free, shock resistant, and affordable and can be molded to encapsulate sensor components and related hardware housed within the sensor node 202. Other materials may be used for construction of nodes for placement in other mediums of different densities.

As noted, the sensor node 202 may include a number of components housed within its spherical form. In exemplary embodiments, the sensor node 202 includes a hydrophone 226 (e.g., a first sensor). The hydrophone 226 may be placed in fluid contact with the medium (e.g., water) via a port 228 in the outer surface of the spherical housing of the sensor node 202. The hydrophone 226 may be located anywhere within the sensor node 202 in any orientation, as long as the hydrophone 226 is in communication with the fluid medium as the hydrophone 226 is sensitive to the magnitude of sound (pressure) waves and is not sensitive to a direction of incidence. In some implementations, the sensor node may be equipped with only a hydrophone if the geophysical survey does not require information of greater fidelity or sensitivity. Placement of a hydrophone sensor in a neutrally buoyant, bottom-dwelling node may provide better geophysical data than a hydrophone pulled by a streamer near the surface. A tethered sensor node at the sea floor is not influenced by surface motion noise from any one of waves, wakes, or movement of the streamer through the water.

In this example, the sensor node 202 also houses one or more velocity sensors 230 (e.g., one or more second sensors), for example, in the form of geophones or accelerometers. In some embodiments, the velocity sensor 230 may be a single component geophone and measure velocity in only a single dimension, e.g., the vertical direction. If performing PZ summation (pressure and vertical (Z) direction), this is the minimum configuration needed, whereby reflection ghosts and multiples in signals recorded by the hydrophone can be attenuated by adding the readings to a scalar multiple of the magnitude of the geophone, which records all wave energy with the same polarity.

In other embodiments, for example, in which greater sensitivity is desired, the velocity sensor 230 may be composed of three separate geophone components (3C) arranged orthogonally to each other to record translational motion in three directions to better pinpoint the direction of the source of the reflected seismic energy wave. Alternatively, a three-dimensional accelerometer (e.g., a micro-electro-mechanical system (MEMS)) may be used in place of three geophones to record acceleration of the sensor node 202 in response to pressure waves and the velocity and direction of the wave can then be calculated therefrom. The additional dimensional information can provide directional information for the source of the subsurface wave reflection and further provide a more accurate measurement of the total magnitude of the wave. For example, the source of a particular wave reflection may be off to a side of the location of a sensor node 202. With three axial measurement components, the velocity sensor 230 may be able to measure the angle of incidence and determine whether the wave energy is directly from the source, reflected from the seafloor, or reflected from the surface. This additional data recorded by 3C sensors may also provide additional noise reduction capability and functionality by identifying waves reflected from locations that are not sub-seafloor in origin.

In other embodiments, the velocity sensor 230 is a single-mass accelerometer positioned concentrically with a center of mass within the sensor node 202. An exemplary single-mass accelerometer is described in further detail herein below. In this embodiment, the velocity sensor 230 measures translational acceleration along three axes and simultaneously measures rotational acceleration around three axes. Thus, the single mass accelerometer functions as a six-component (6C) sensor. In addition to recording translational motion with respect to three axes to pinpoint the sources of wave energy, the measurement of rotational motion about any of the three axes allows for further noise reduction calculations to be performed to attenuate the impact of other external forces (e.g., tension and shear as further discussed herein) acting on the sensor node 202.

In any implementation of the velocity sensors 230 discussed above, the velocity sensors 230 can be located concentrically at the geometric center of mass and center of buoyancy of the sensor node 202, or as close thereto as possible, to more accurately measure the particle velocity of the sensor node 202 in response to incident waves in the medium. As noted above, the mechanical response of the sensor node 202 to wave velocity in the medium as a particle velocity sensor is further idealized by the spherical shape.

Additional components may also be housed in the sensor node 202 to aid in sensor measurements and functionality. For example, one or more batteries 240, 242 (e.g., power sources) may be housed in the sensor node 202 to provide power to any of the components housed therein. Additionally, a compass 254 and a tilt sensor or inclinometers 256, 258 may be included in the sensor to identify the direction and vertical orientation of the sensor node 202 itself. Such information can further assist in accurately identifying the source direction of a measured signal by allowing for calculation adjustments based upon the attitude and orientation of the sensor node 202 with respect to the earth. In a configuration in which the single-mass accelerometer is used as the velocity sensor 230, a sensor node 202 including a compass 254 and inclinometers 256, 258 is effectively a ten component (10C) sensor.

The sensor node 202 may further include control circuitry or a processor (generally referred to as computer circuitry), and associated memory in a compute complex 252 for processing and calculating, e.g., the measured information, performing PZ summation, directional calculations, and noise reduction processing. The processed measurements may be stored in the memory in the compute complex 252 for later download once the sensor node 202 is extracted from the medium. Alternatively, the processor 250 may be provided to merely manage the storage of recorded data in the memory in the compute complex 252 for later processing after the sensor node 202 is retrieved from the medium. In either case, the sensor node 202 may further have a communication port 224 (e.g., a USB port) capable of interfacing with an external connector for data transfer from the memory in the compute complex 252 and for charging the batteries 240, 242.

The optional components such as batteries 240, 242, compute complex 252, clock, compass 254, inclinometers 256, 258, etc., may be mounted symmetrically about and as close to the center of the spherical sensor node 202 as possible in order to avoid creation of a nonzero POI. Again, it may be desirable to concentrically locate the center of mass with the center of buoyancy of the sensor node 202 to maximize its ability to function as a wave follower. However, the position and arrangement of any of the internal components of the sensor node 202 depicted in FIG. 2 are schematic in nature only and are not intended to be construed as actual or necessary positions or arrangements for any of the components that may be housed in a sensor node 202 of any of the implementations disclosed herein.

A neutrally buoyant, free-floating, spherical node is free from seabed forces. Such a spherical node will respond to translational movement only and will not rotate when exposed to an acoustic seismic wave. If the specific gravity of the spherical node matches the specific gravity of the seawater, an ideal directional particle velocity sensor would result. However, the reality is that a sensor node cannot be free-floating; it has to maintain a substantially constant position within a seismic survey array. This means it must be held in place by some mechanism, typically a rope tether 204 attached to an anchor 208 as described above. Thus, an ideal water-borne, tethered sensor system for measuring particle velocity would incorporate a seabed anchor which rejects both seabed motion and acoustic particle motion. The seabed anchor should have a specific gravity as dissimilar to seawater and seabed density as possible. The combination of a neutrally buoyant, spherical node and with a specific gravity of unity with respect to seawater and an anchor with a large specific gravity with respect to seawater provides a high signal to noise ratio. Additionally, the tether 204 connecting the sensor node 202 to the seabed anchor would ideally neither be under nor impart any tension or other force to the sensor node 202. The tether 204 would be responsive to acoustic waves yet not transmit any ground motion. The connection of the tether with the sensor node would also be torque free.

Unfortunately, a seabed anchor 208 will likely be subject to and transfer seismic energy as a force of some kind acting on the system. The seabed anchor 208 can be agitated by and transmit any movement of the earth, e.g., a tremor due to plate movement, volcanic activity, explosion, drilling in close proximity, etc. In addition, during a seismic survey, the source sound from the air cannon or air gun can agitate seabed anchors depending upon the distance of the sensor array from the air cannon unless they are completely trenched below the seabed. In particular, Scholte waves can be activated by the air cannon. Scholte waves are slow moving waves which propagate in the shallow, unconsolidated mud layers on the sea floor (trapped between a liquid and a solid). Scholte waves are analogous to ground roll on land data. The noise is usually low frequency and low velocity.

A shear wave (S wave), is a seismic body wave that shakes the ground back and forth perpendicular to the direction the Primary or longitudinal wave (P wave). While the P wave may be primarily vertical in orientation, it does travel at angles from the source as it radiates through the medium and thus impacts the seafloor and subsurface stratum at various angles. This pressure is translated into horizontal and vertical shear components that shake the stratum, albeit at very low frequency and low velocity. As seabed anchors are embedded in the mud on the seafloor, they are impacted by both Scholte waves and shear waves transverse to the vertical axis.

In contrast, a spherical sensor node floating neutrally would be free from shear wave noise contamination generated in the stratum. Water is incapable of transmitting shear. While Scholte waves travel through a fluid solid interface, they do ultimately create pressure waves in a fluid medium. However, these pressure waves decay exponentially away from the solid-fluid water bottom interface and therefore may be significantly attenuated in a buoyant sensor node by locating the sensor node at an appropriate height above the seafloor, e.g., 10 m. The specific gravity of an ideal water borne sensor and tether should match the specific gravity of the water.

As noted, however, a buoyant sensor node must still be attached to an anchor by a tether. Shear waves and Scholte waves may impact the anchor which, in turn, will transmit such noise to a connected buoyant sensor node through the tether. Tether vibration is a superposition of mechanical waves, transverse and longitudinal to the length of the tether, excited by the acoustic response of the tether, the sensor node, and the seabed anchor as well as the mechanical response of the seabed anchor. A seismic motion sensor (i.e., sensing displacement, velocity, or acceleration) is subject to shear, and thus rotational forces, if it is in contact with the ocean bottom or is tethered to anything which imparts a moment in response to the shear. Rotation of a seismic sensor induces an erroneous signal on the translational axis. Thus, if particle velocity is the focus of measurement, a rotational force induced through shear and transmitted through a tether will create noise in the recorded signal. Therefore, it is important to determine additional methods to reduce noise that can affect the accuracy of a particle velocity signal. Such methods can be implemented in the mechanical system design, the sensor design, signal processing, or any combination thereof.

Figure 3:
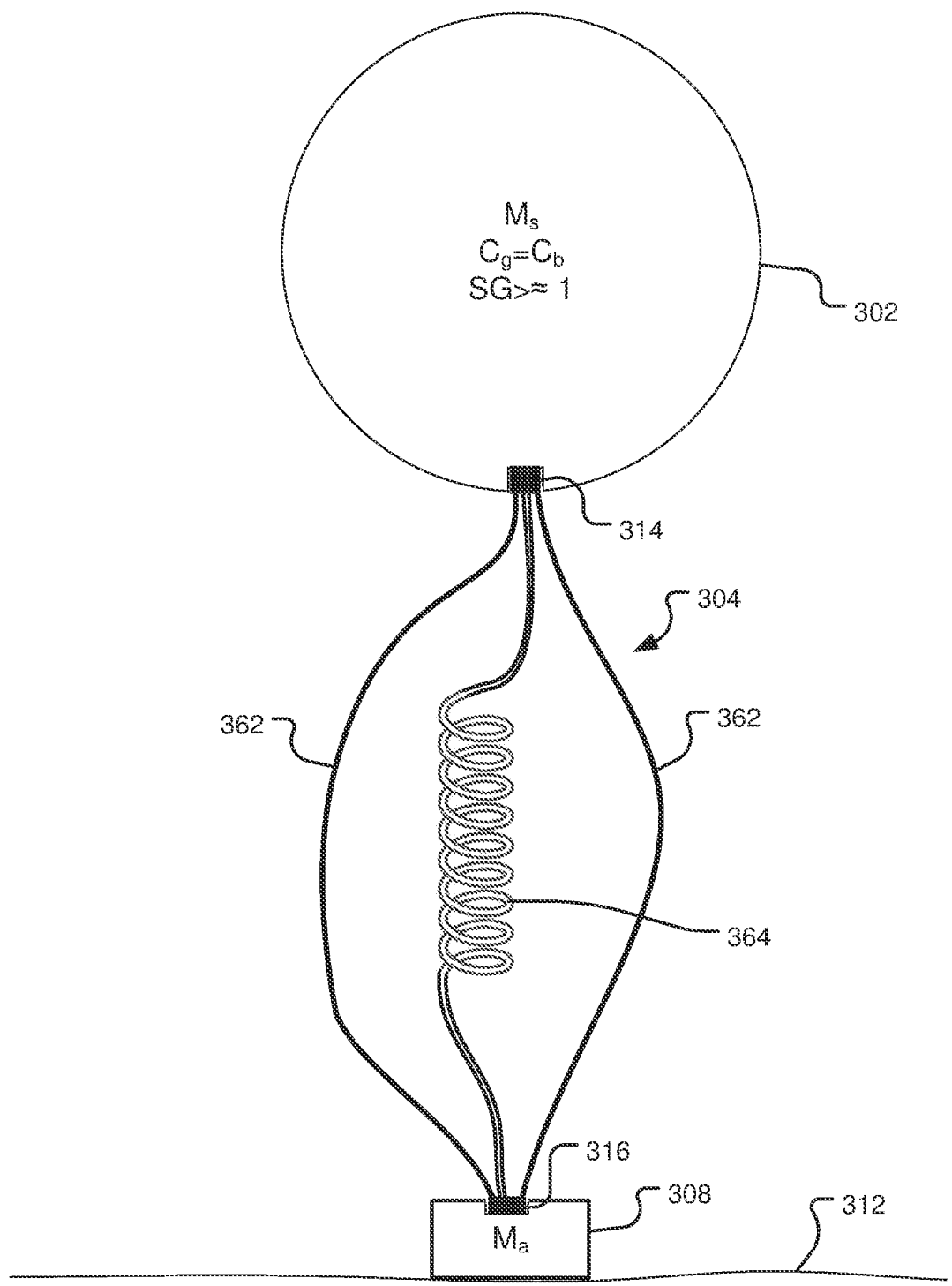
FIG. 3 is a schematic diagram of an embodiment of a single, spherical, neutrally buoyant, seismic sensor node tethered without tension to a weighted anchor positioned on the seafloor.

With respect to noise reduction through mechanical system design, FIG. 3 depicts an exemplary implementation of a tether design for a neutrally buoyant sensor node 302 floating above the seafloor 312. In this embodiment, the sensor node 302 is connected to an anchor 308 resting on or embedded in, e.g., the mud of the seafloor 312 by a tether 304. The sensor node 302 is spherical and may be constructed in accordance with any of the combinations of sensors and components as previously described with respect to FIG. 2. It is a standard convention that a particle follower object is dimensionally equal to or less than 1/20 of the shortest wavelength. As previously noted, the highest frequency of interest is ~250 Hz, which in water (1,500 m/s) generates a wavelength of 6 meters. Thus, in one embodiment, the diameter of the sensor node 302 for use in undersea seismic surveys is approximately 300 mm (~12 in.) in diameter (i.e., 6 m/20)+/−5% of tolerance. As previously described, the center of mass/center of gravity is congruent with the center of buoyancy. Similarly, the sensor node 302 may be constructed to have a specific gravity generally congruent with respect to the medium in which it is deployed (e.g., seawater at 1.025).

As indicated above, the tether 304 may be of a sufficient length to significantly attenuate any effects of Scholte waves traveling through the medium on particle velocity measurements made by the sensor node 302. The tether 304 may be attached to both the sensor node 302 and the anchor 308 via connectors 314, 316 and connection schemes as described with respect to FIG. 2 designed to minimize the transfer of torque to the sensor node 302 through the tether 304 from forces acting on the anchor 308. The tether 304 may also be configured to have a density that substantially matches the density of the medium (e.g., sea water), so that it will not provide a significant downward force on the sensor node 302 due to its mass and also so that it will move with the sensor node 302 as a particle velocity follower. Even so, and with such precautions, without further additional design improvements, the tether may still generate mechanical waves out of phase with the sensor body 302 that are length and tension dependent due to its attachment to the anchor 308.

Induced motion from the seabed anchor 308 to the sensor node 302 may be modeled as a mechanical transmission line. A low-pass mechanical system may be modeled to attenuate sea floor motion and have adequate strength for commercial deployment and recovery. In one implementation, the tether 304 may be formed of a viscoelastic material having a dynamic and quasi-static response to dynamic tension, which can be modeled using Maxwell's three-parameter theory. However, other tether materials and attenuation models can also be used to design an appropriate tether to attenuate the sea floor forces.

The tether 304 in the embodiment of FIG. 3 is depicted schematically and is exaggerated to indicate the function of the components rather than to provide an image of the actually device. The tether 304 may be composed of two components, an outer sheath 362 and an inner elastic cord 364. The inner elastic cord 364 may be understood as a "bungee" cord or shock cord fitted coaxially within the outer sheath 362 which defines a conduit for the inner cord 364. The inner elastic cord 364 may be a low pass mechanical filter. In some embodiments, the corner frequency for the filter may be selected between 2 Hz-4 Hz, which is at the bottom of the typical response range for seismic hydrophones and geophones. (The frequency range of interest is typically between 1 Hz and 250 Hz.) The spring constant of the inner elastic cord 364 may be selected to be weak to achieve attenuation along the length of the tether between −40 dB to −60 dB. Some noise may travel through the outer sheath 362, but such is significantly attenuated (e.g., by approximately −40 dB) due to the lack of tension in the outer sheath 362. The spring constant of the inner elastic cord 364 may be chosen such that, as the neutrally buoyant sensor node 302 floats, it is pushed away from the seabed anchor 308 if traveling downward. Similarly, if the sensor node 302 pulls away from the sea floor due for forces in the medium, the inner elastic cord 364 will dampen and arrest such travel before any tension is placed on the outer sheath 362.

The outer sheath 362 may be load-bearing when under tension (in order to allow for deployment and retrieval of the sensor node 302 and lift the anchor 308 without straining the inner elastic cord 364), but not transfer compression or torsional forces such as load or torque (in order to minimize transfer of forces acting on the anchor 308 to the node). For example, the outer sheath 362 may be formed as a helically woven braided rope or cable (e.g., a Chinese finger cuff) that resists force when placed under longitudinal tension, but collapses under longitudinal compression and, due to the looseness of the weave when under compression, torsional force transfer is significantly attenuated. The material and design of the outer sheath 362 may be selected to provide a safety factor (e.g., ×10) to provide resiliency through multiple deployment and recovery operations (i.e., bend cycles) and environmental aging. In one exemplary implementation, the outer sheath 362 may be woven from ultra-high molecular weight polyethylene (UHMWPE, aka, "Spectra") fibers, which are torque free and neutrally buoyant in seawater. The inner diameter of the outer sheath 362 in a neutral or compressed state may be designed to be large enough such that the inner elastic cord 364 freely moves within the outer sheath 362 without frictional interference.

Figure 4:
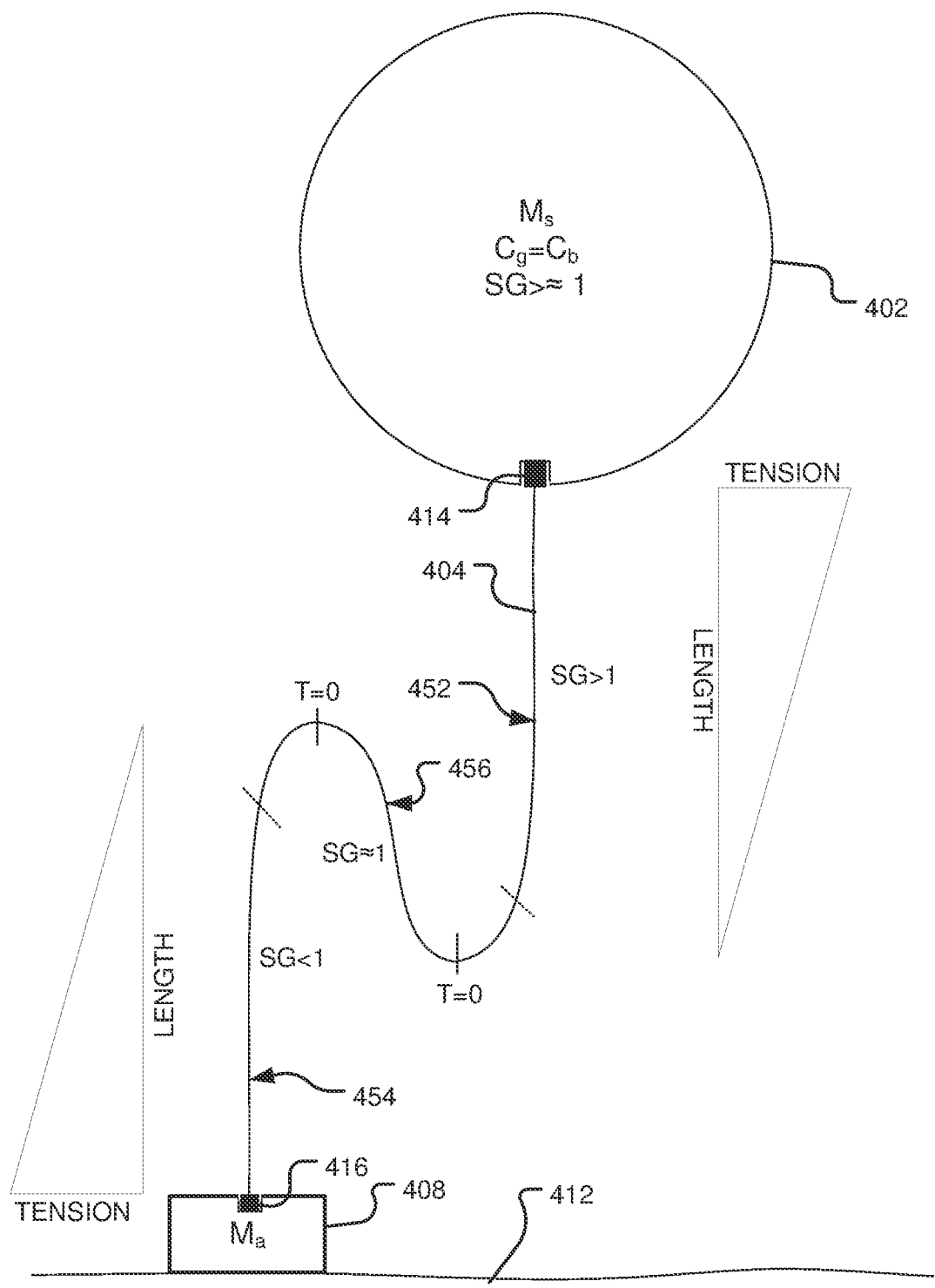
FIG. 4 is a schematic diagram of another embodiment of a single, spherical, neutrally buoyant, seismic sensor node tethered without tension to a weighted anchor positioned on the seafloor.

An alternate embodiment of a tether design for a neutrally buoyant sensor node 402 floating above the seafloor 412 is depicted in FIG. 4. In this embodiment, the sensor node 402 is connected to an anchor 408 resting on or embedded in the seafloor 412 by a tether 404. The sensor node 402 is spherical and may be constructed in accordance with any of the combinations of sensors and components as previously described with respect to FIG. 2. Thus, the diameter of the sensor node 402 for use in undersea seismic surveys may be approximately 300 mm as in the prior embodiments. Again, the center of mass/center of gravity is congruent with the center of buoyancy and the sensor node 302 may be constructed to have a specific gravity generally congruent with respect to the medium in which it is deployed (e.g., seawater at 1.025).

The tether 404 may be of a sufficient length to significantly attenuate any effects of Scholte waves traveling through the medium on particle velocity measurements made by the sensor node 402. The tether 404 may be attached to both the sensor node 402 and the anchor 408 via connectors 414, 416 and connection schemes as described with respect to FIG. 2 designed to minimize the transfer of torque to the sensor node 402 through the tether 404 from forces acting on the anchor 408.

As discussed above, when exposed to shear waves on the seabed, the anchor 408 converts both shear and vertical motion into tension on the tether 404. Tension is a scalar value, meaning it has no directivity or vector form. The tension sets up a longitudinal and transverse wave as a superposition of frequencies in the tether 404 just like a transmission line. The vertical motion sensor in the spherical sensor node 402 records all impulses on the tether 404. The vertical motion sensor is unable to discriminate between shear and vertical motion. The horizontal sensors will not respond. Further the gain of the vertical up going and down going signal differs as one cannot push on a rope. Therefore, in order for the neutrally buoyant, spherical sensor node 402 tethered to an anchor 408 to accurately record only particle motion in the vertical dements, the tether 404 should translate as little tension as possible to the sensor node 402.

The speed of sound (c) in a string or cable is the square root of the tension (T) per mass per unit length (∈) of the string $$\left(c = \sqrt{\frac{T}{\epsilon}}\right).$$

Therefore, if there is no tension in the tether 404, there is no energy transfer.

In the embodiment shown in in FIG. 4, the tether 404 is constructed in three sections, a first heavy section 452 adjacent to and connected to the sensor node 402, a light section 356 adjacent to and connected to the anchor 408, a middle neutral section 456 extending between and connecting the heavy section 452 and the light section 454. Together, the three sections create a Z-bend in the cable with two points of inflections. The heavy section 452 may have a specific gravity greater than seawater (e.g., 113). The light section 454 may have a specific gravity less than seawater and less than 1 (e.g., 0.9). The neutral section 456 may have a specific gravity of 1.025 to match the average density of seawater. The tether sections may be made of different materials of different densities woven or otherwise joined together at connection interfaces. The heavy section 452 may be modeled as part of the mass of the sensor node 402 for purposes of allocating components to ensure the center of gravity and center of buoyancy remain in the physical center of the sensor node 402. The light section 454 floats as it has a density less than water. The light section 454 will maintain a vertical orientation as one end of the light section 454 is attached to the anchor 408. The neutral section 456 will naturally form a Z-bend as it transitions from the upward end of the vertically oriented light section 454 to the downward end of the vertically oriented heavy section 452. Tension on the tether 404 thus reaches substantially zero in the middle of each bend (i.e., the inflection points) in the neutral section 456 as indicated in FIG. 4. The bends in the neutral section 456 act as release boundaries for the traveling longitudinal and transverse waves, both from the seabed anchor 408 and from the sensor node 402 moving in response to pressure wave as a follower.

Figure 5:
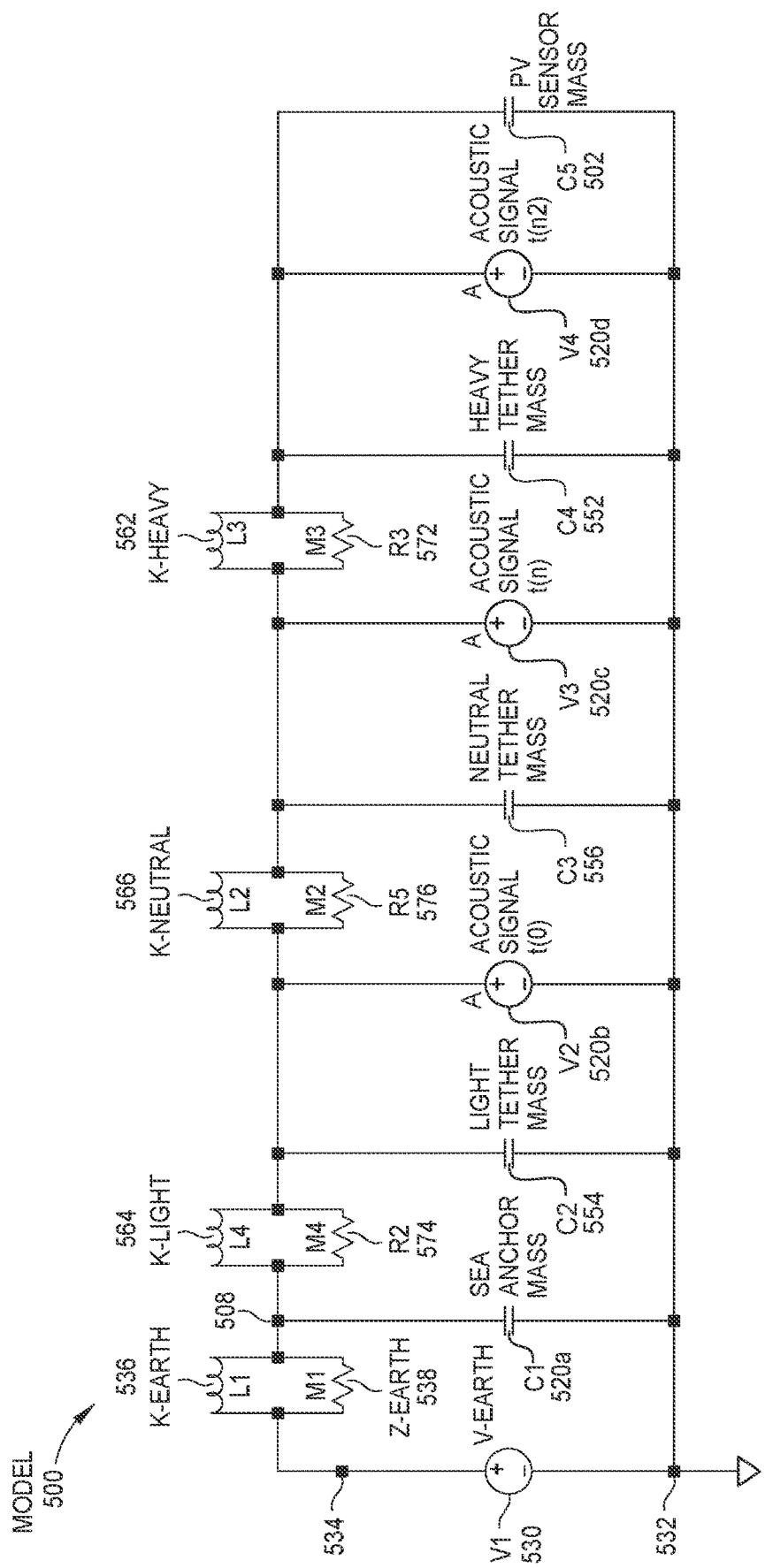
FIG. 5 is a schematic mechanical mobility model of the forces acting on a spherical, neutrally buoyant, seismic sensor node tethered without tension to a weighted anchor positioned on the seafloor.

FIG. 5 is a schematic mechanical mobility model 500 of the forces acting on the spherical, neutrally buoyant, seismic sensor node 402 of FIG. 4 connected without tension via the tether 404 to a weighted anchor 408 positioned on the seafloor. Electro-mechanical and electro-acoustic modeling techniques used in the model 500 evaluate the geophysical impact of the tether 404 on the sensor node 402. In the model 500, the following mechanical attributes are modeled by electrical analogues used in the diagram: velocity (m/s) =voltage; force (N)=current; mechanical resistance (kg/N*s) =electrical resistance; mass (kg)=capacitance; and spring constants (elasticity of tether) (kg/N)=inductance. Forces (N) acting on the system are analogous to electrical current in the model, but are not measured in this analogue. Rather, velocity is measured. As noted above, wave velocity on the tether directly depends from the tension (force) on the tether. If velocity measures 0 at any point in the model 500, then there is no tension on the tether at the point of measurement.

In FIG. 5, the masses of each of the components in the tethered sensor node system are modeled as capacitors in the mechanical mobility model 500. The mass of the seabed anchor 408 is depicted as capacitor 520a. The mass of the sensor node 402 is depicted as capacitor 502. The mass of the light section 454 of the tether 404 is depicted as capacitor 554. The mass of the neutrally buoyant section 456 of the tether 404 is depicted as capacitor 556. The mass of the heavy section 452 of the tether 404 is depicted as capacitor 552.

Mechanical resistance/impedance to forces acting on the various sections of the tether 404 attenuate tension (and thereby velocity) along the tether 404 are also modeled. Three primary attenuation factors are shown along each section of the tether 404. First is the elasticity of the tether 404 that provides shock absorption along the length. Because each section of the tether has a different density and possibly material construction, each section of the tether has different effective spring constants and different damping effects, which are depicted in the model 500 as inductors 562, 564, 566. In addition to the mechanical damping, there is mechanical resistance in the form of energy dissipation of the spring damping in the tether sections. This mechanical resistance is presented in the model 500 as resistors 572, 574, 576 in parallel with the spring damping inductors 562, 564, 566. Finally, since the tether 404 is deployed within a fluid medium (e.g., seawater), the medium will also provide mechanical resistance to forces acting on the tether 404 (and thereby wave velocity) at any particular location along the tether 404.

It should be noted that no dampening forces are modeled with respect to the mass (capacitor 502) of the sensor node 402. The goal is to remove tension forces from the tether 404 on the sensor node 402. Further, because the sensor node 402 is designed to be a wave follower within the medium, there are no mechanical resistance forces from the medium—the spherical sensor node 402 moves in concert with (rather than opposed to) the medium in order to record the vector particle velocity of the reflected P-waves in the medium.

Various forces acting on the system are presented in the model 500 in terms of velocities generated and measurable within the system. In mechanical systems the velocity of the masses must be measured against some fixed reference frame, usually the earth. This is analogous to voltage potentials being measured with respect to ground in an electrical circuit. The fixed velocity of the earth in the model 500 is represented with respect to various velocity sources affecting the system by ground symbol 532. Movement of the earth (e.g., from shear forces) and the resultant velocity which is transferred to the sea anchor mass 508 is indicated in the model 500 by voltage generator 530, which is measured with respect to a fixed inertial frame of reference, i.e., ground 532. The shear forces originating in the earth can be generated by earthquakes, volcanic activity, nearby explosions or drilling, etc., in addition to the reflections of acoustic energy from a seismic survey canon transformed into shear forces in the stratum. The effect of all of these shear forces on the seabed anchor mass 508, while transmitted to the capacitor 520*a* (representing the seabed anchor mass) through its contact with the seafloor, is also attenuated to some extent by the interface with the soft sediment of the seafloor (i.e., the seabed anchor 408 is partially buried in the mud—it sinks due to its significant mass—and the mud acts as mechanical impedance). The dampening effect of the seafloor sediment on shear transfer to the seabed anchor is depicted in the model 500 as parallel inductor 536 (representing a spring resistance of the mud) and resistor 538 (representing the energy dissipation of the mud).

Additional forces acting on the system are acoustic forces in the form of P-waves caused by the air gun source traveling downward as well as upward reflections from undersea stratum structures. The original and reflected acoustic P-waves are typically out of phase and are incident on the masses from various directions. This creates a complex superposition of wave magnitude and direction within the medium. The sum of acoustic forces (and related velocities) interacting with different masses in the system may be different due to different locations of impact. The model 500 depicts these differences in incident velocity due to the acoustic P-wave forces at different locations in the system as separate "voltage" sources. Velocity generated in the capacitor 554 of the light section 454 of the tether 404 may be represented by velocity (voltage) generator 520*b*. Velocity generated in the capacitor 556 of the neutral section 456 of the tether 404 may be represented by velocity (voltage) generator 520*c*. Velocity generated in the capacitor 552 of the heavy section 452 of the tether 404 may be represented by velocity (voltage) generator 520*d*.

As discussed with the embodiment of FIG. 4, the neutral section 456 of the tether 404 can form a Z-bend between the connection locations with the light section 454 and the heavy section 452. At the apexes of the Z-bend, tension on the neutral section of the tether 404 is effectively 0. In the model 500, this means that neutral section capacitor 556 does not respond to earth motion, rather follows the acoustic signal generated by the seismic source and the reflected acoustic signal.

Additional velocity measurement points within the model 500 may be provided in the system. For example, the velocity of the earth movement in response to shear forces can be measured near the seabed anchor 408 at sensor location 534. A preferred particle velocity sensor in the form of a single mass accelerometer is further described in detail below.

Multi-Axis, Single Mass Sensors

As described previously with respect to FIG. 2, the velocity sensor 230 may be a single-mass accelerometer positioned concentrically within the sensor node. A single mass accelerometer is capable of measuring translational acceleration of the sensor node along three axes and simultaneously measuring rotational acceleration of the sensor node around the three axes. Thus, the single mass accelerometer functions as a six-component (6C) sensor. In addition to recording translational motion with respect to three axes to pinpoint the sources of P-wave energy, the measurement of rotational motion about any of the three axes allows for further noise reduction calculations to be performed to attenuate the impact of other external forces acting on the sensor node 202. When the mass of the single mass accelerometer is positioned near the center of mass and center of buoyancy of the sensor node, the measurements are precise and no additional approximations and calculations need be performed to attempt to conform readings of multiple accelerometers positioned at various locations within a sensor receiving slightly different force inputs.

An implementation of a multi-axis, single mass accelerometer 600 is depicted in accompanying FIGS. 6A-6D, which can be used as the velocity sensor 230 illustrated in FIG. 2 that is encapsulated in the body 222. The accelerometer 600 is configured to detect both translational and rotational acceleration. The accelerometer 600 is principally composed of a test body or test mass 602 (e.g., an inertial mass) housed by, suspended within, and connected to a frame 608 through a plurality of sensors 606. (Note: in the figures the sensors are labeled 606*a*1-606*f*2; however, indication of all the sensors collectively in this discussion may be made merely by reference to "sensors 606.") The frame 608 provides a reference structure for measurement by the sensors 606 of the inertial resistance of the mass 602 to acceleration of the frame 608 when subjected to external stimulus or energy. The frame 608 may define six flat faces 610 forming a cube around the mass 602. Such a frame 608 may be formed as a monocoque or similar structural shell component, machined from a suitable metal material, ceramic (e.g., a MACOR material), or from another material with suitable rigidity and other mechanical properties. In one embodiment, the frame 608 is extremely stiff and withstands deformation under typical forces and loads to be experienced by the accelerometer 600. In one exemplary implementation the frame 608 may be machined out of brass. In the embedment shown in FIGS. 6A-6D, the frame 608 is of two-part construction consisting of a first half 612*a* and a second half 612*b*, shown to better advantage in FIGS. 6 and 7. Each of the first and second halves 612*a*, 612*b* may be machined with threaded shafts to receive screws or other fasteners to fix the first and second halves 612*a*, 612*b*.

A central aperture 632 may be formed in each of the side faces 610 of the frame 608 defined and surrounded by a plurality of lateral pillars or beams 614 extending between corner structures 616 to provide a perimeter framework for a cubic frame 608. The central apertures 632 may be oblong in shape as shown, but may be formed in any other shape (e.g., square, octagonal, etc.) sufficient in size (area) to expose a surface of the test mass 602 for structural connection with the sensors 606. In symmetric embodiments, the beams 614 and corner structures 616 may be similarly formed to be substantially identical in size, thickness, and construction. One exterior surface of each of the beams 614 may be recessed to form a pocket 630. Opposing beams 614 may define a pair of pockets 630 on each face 610 of the frame 608. The orientation of each pair of pockets 630 on a face 610 is orthogonal to pairs of pockets 630 on each adjacent face 610 and parallel to the orientation of the pockets 630 on the opposing face 610 of the frame 608. Interior surfaces of the frame 608 may be machined to match a curvature of the form of the test mass 602 in order to provide a close tolerance between the frame 608 and the test mass 602 to maintain a uniform separation distance between the interior surfaces of the frame 608 and the test mass 602 suspended therein. Alternatively, the interior surfaces of the frame 608 need not be machined for close tolerances and the separation distances between various of the interior surfaces of the frame 608 and the test mass 602 suspended therein can be different. However, the test mass 602 is typically centered within the frame 608.

In some implementations, the test mass 602 may be a hollow sphere, for example, made of a relatively dense or "heavy" material, i.e., a material with a high specific gravity to provide a significant moment of inertia relative to the size of the test mass 602, particularly when the accelerometer 600 is small in size, e.g., less than 3 cm. In exemplary embodiments, the test mass 602 may be made of brass or titanium formed as hollow spheres with uniform wall thickness comprising the mass. In some embodiments, areas on a spherical mass may be flattened to aid in attachment of the test mass 602 to the frame 608. In such embodiments in which the density of the test mass 602 is not uniform (e.g., due to variations in surface form or wall thickness, or both), it is desirable that the mass distribution of the test mass 602 be symmetrical. As rotational movement is to be measured, the polar moment of inertia of the test mass 602 is an additional factor to consider in the design of the test mass 602. The size, mass, and density of the test mass 602 may thus be selected to optimize the response characteristics for both translational and rotational acceleration sensitivity. Depending upon the type of acceleration to be measured, the characteristics of the test mass 602, as well as the frame 608, may be tuned to be sensitive in desired frequency bandwidths while attenuating undesired bandwidths.

Other configurations of the test mass 602 are also possible; for example, a solid sphere or multifaceted shape (e.g., a symmetrical polyhedron) having symmetry about axes X, Y, and Z. Generally, shapes that are symmetrical about one or more axes of translation or rotation are suited for achieving the desired sensory results in an accelerometer, as described herein. In other implementations, the test mass 602 may be solid rather than hollow, and formed either of a single substantially uniform material or from one or more different types of core materials and additional layers or components that build out to the outer layer or outer surface of the test mass 602. The determinations of whether the body of the mass 602 should be hollow or solid, and homogenous or made of multiple materials and layers, are design choices made to achieve the dynamic requirements of both translational and angular acceleration measurements for a particular environment or application.

Depending on embodiment, one or both of the test mass 602 and the outer surface thereof may be formed of an electrically conductive material in order to provide a conductive path for connection with an electrode of a sensor or transducer as described herein. For example, the test mass 602 may be formed as a solid or hollow sphere of aluminum, brass, copper, beryllium copper, or other conductive material, or the test mass 602 may be formed of a ceramic or other insulating material with a conductive coating on the outer surface (e.g., in a gold, aluminum, or other conductive metal plated configuration).

Alternatively, one or both of the test mass 602 and the outer surface of the test mass 602 may be made of a nonconductive or electrically insulating material, e.g., to reduce the effect of stray capacitance on the signal-to-noise (S/N) ratio of the accelerometer 600, e.g., caused by the conductive area of the test mass 602. For example, the test mass 602 may be formed as a solid or hollow sphere of a machinable ceramic (e.g., a MACOR material), or from an injection molded plastic.

As shown in FIGS. 6A-6D, the test mass 602 may be attached to a number of sensors 606 by a number of braces or struts. In an exemplary implementation, these struts may be formed as flat, blade-like structures, hereinafter referred to as suspension blades 620a-620f, that attach to the sensors 606 at lateral ends and to the test mass 602 at a center location along the length of each suspension blade 620a-620f. The sensors 606 are mounted at various locations on the frame 608. In the embodiment shown in FIGS. 6A-6D, in order to aid in attachment to the suspension blades 620a-620f, the spherical test mass 602 may be formed with a number of planar coupling surfaces 604, wherein each attachment surface 604 is at a radial distance from the center of the spherical test mass 602 less than the radius of the spherical test mass 602. If determination of translational and rotational accelerations is desired with respect to more than one independent direction, the transducers may be disposed along independent (e.g., transverse or orthogonal) axes X, Y, and Z. In the embodiment of FIGS. 6A-6D, six planar coupling surfaces 604 are formed in opposing pairs on the outer surface of the test mass 602, aligned with opposing ends of the three orthogonal axes X, Y, and Z having an origin at the center of the test mass 602; and thus an axis between each opposing pair is orthogonal to axes extending between each of the other opposing pairs. The coupling surfaces 604 provide a bonding and alignment surface for attachment of the suspension blades 620a-620f. Additionally, an insulator 634, e.g., a ceramic pad, may be placed between the coupling surfaces 604 and respective suspension blades 620a-620f in order to provide electrical isolation between the test mass 602 and the sensors 606. The suspension blades 620a-620f may be fixed to respective coupling surfaces (with or without an insulator 634) via an adhesive or other bonding agent (e.g., a metal weld if both the test mass 602 and suspension blades 620a-620f are metals capable of welding and electric isolation is not necessary).

Figure 6A:
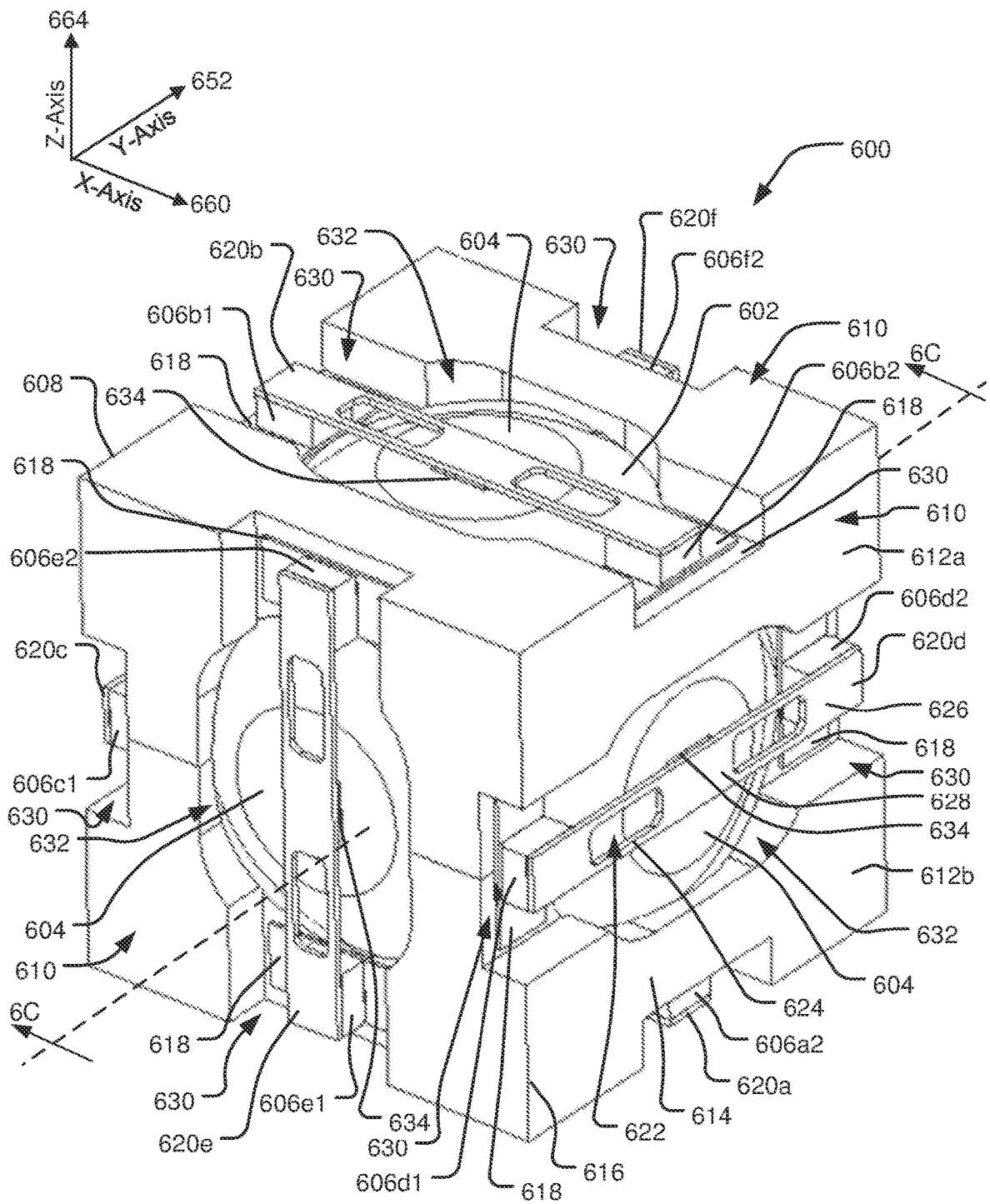
FIG. 6A is an isometric view of a multi-axis, single mass accelerometer according to an exemplary embodiment disclosed herein.
Figure 6B:
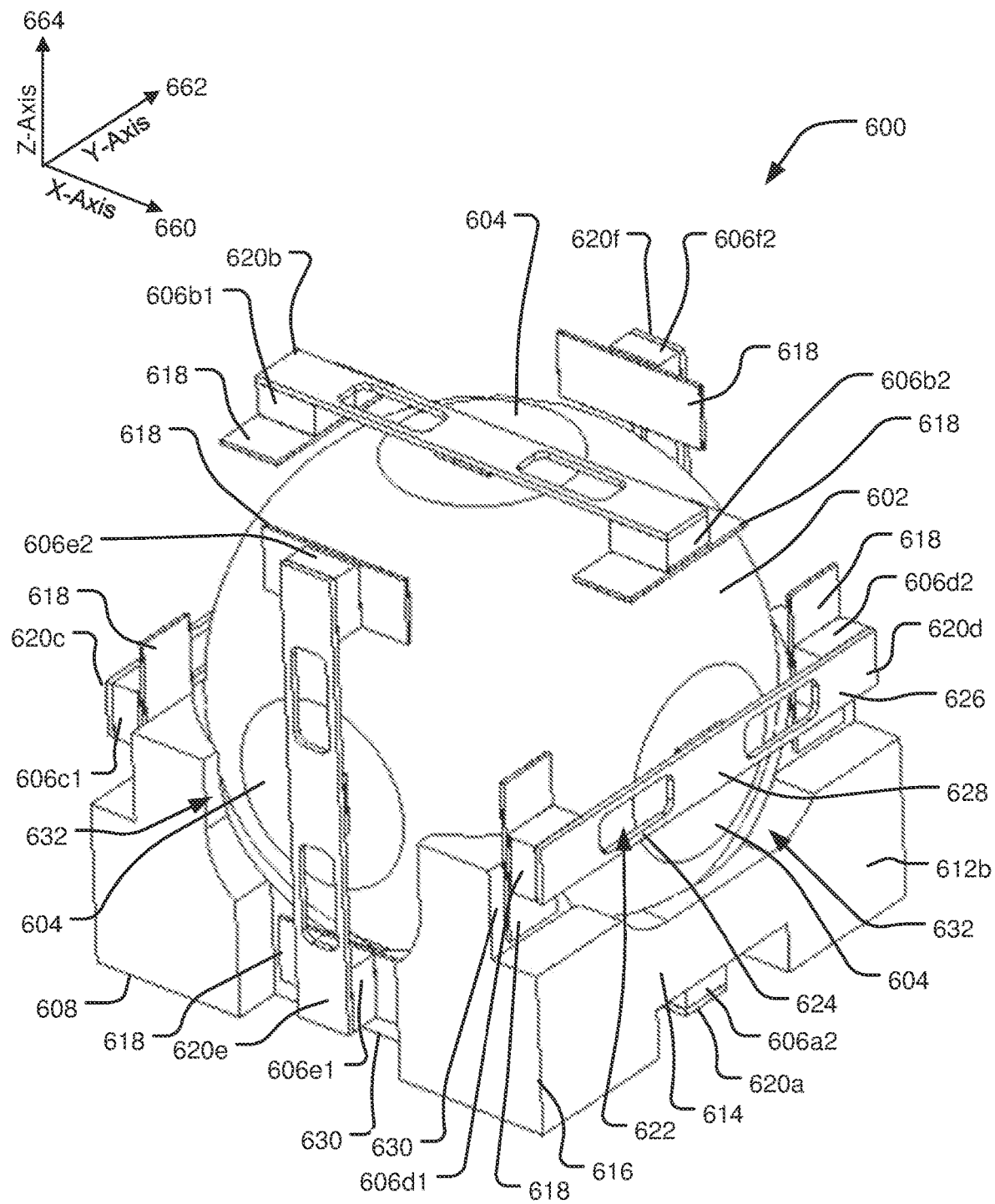
FIG. 6B is an isometric view of the multi-axis, single mass accelerometer of FIG. 6A with a top half of the frame removed.
Figure 6C:
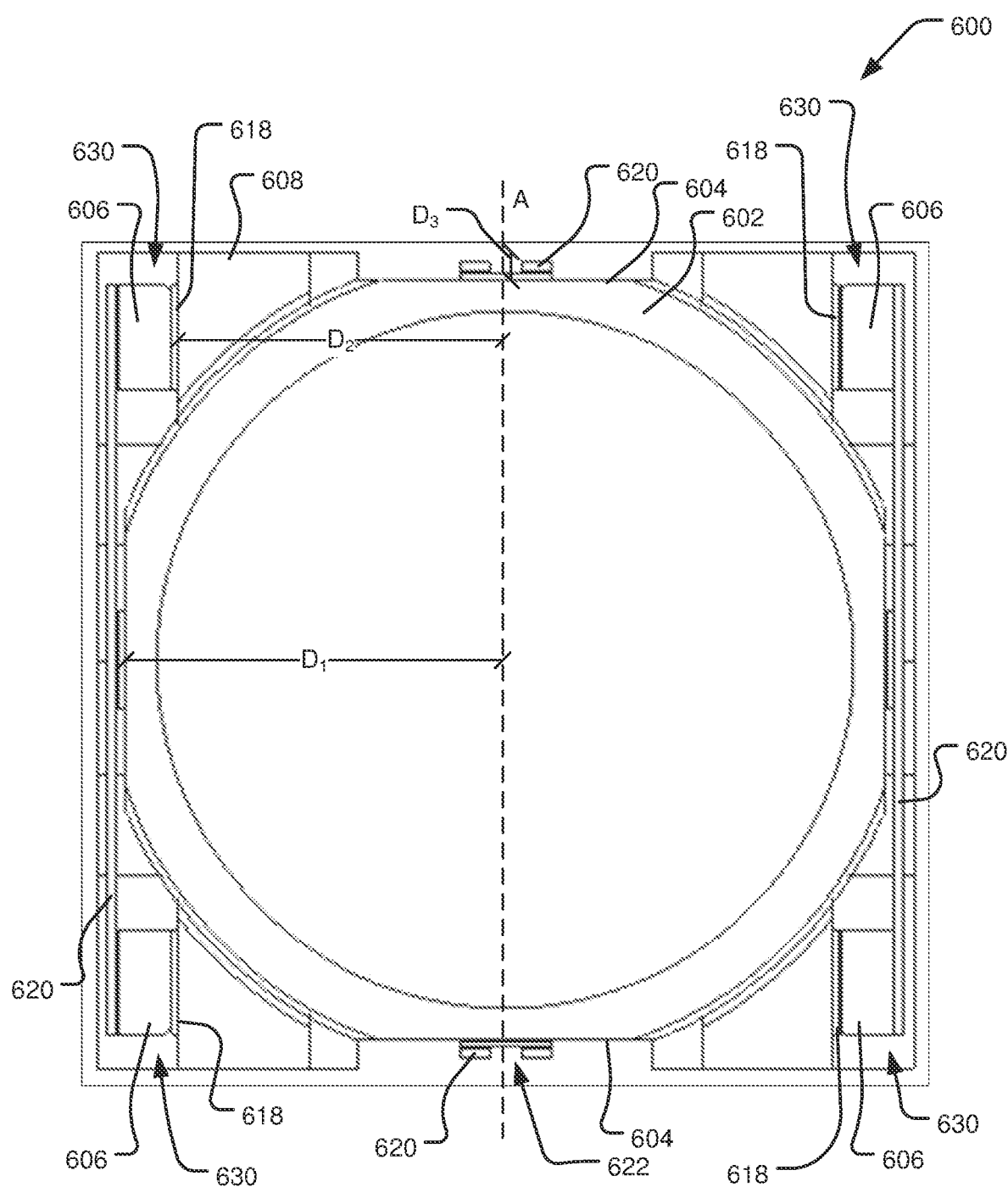
FIG. 6C is an elevation view in cross-section along line 6C-6C of FIG. 6A of the multi-axis, single mass seismic accelerometer of FIG. 6A.
Figure 6D:
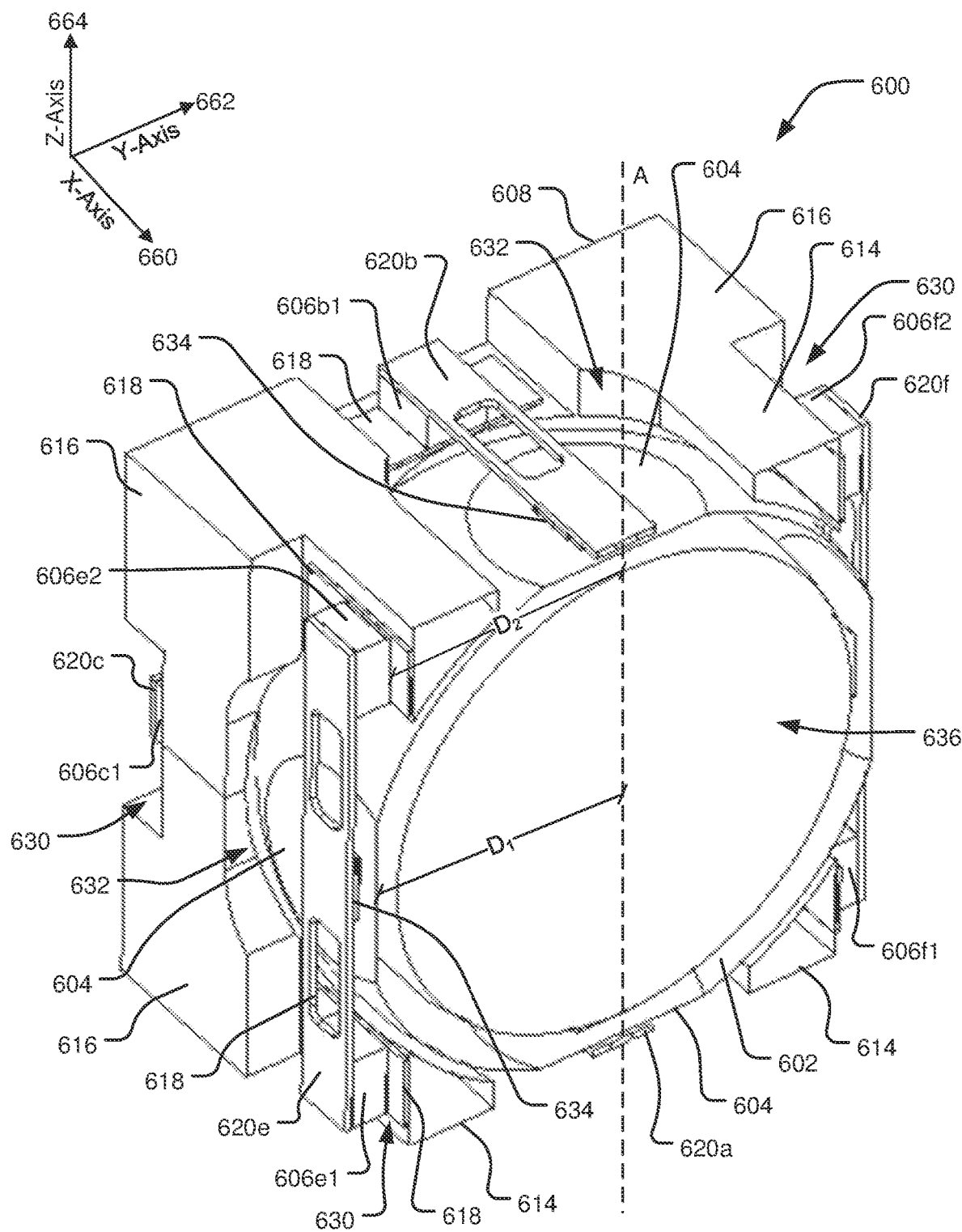
FIG. 6D is an isometric view of FIG. 6C of the multi-axis, single mass seismic accelerometer of FIG. 6A.
Figure 6E:
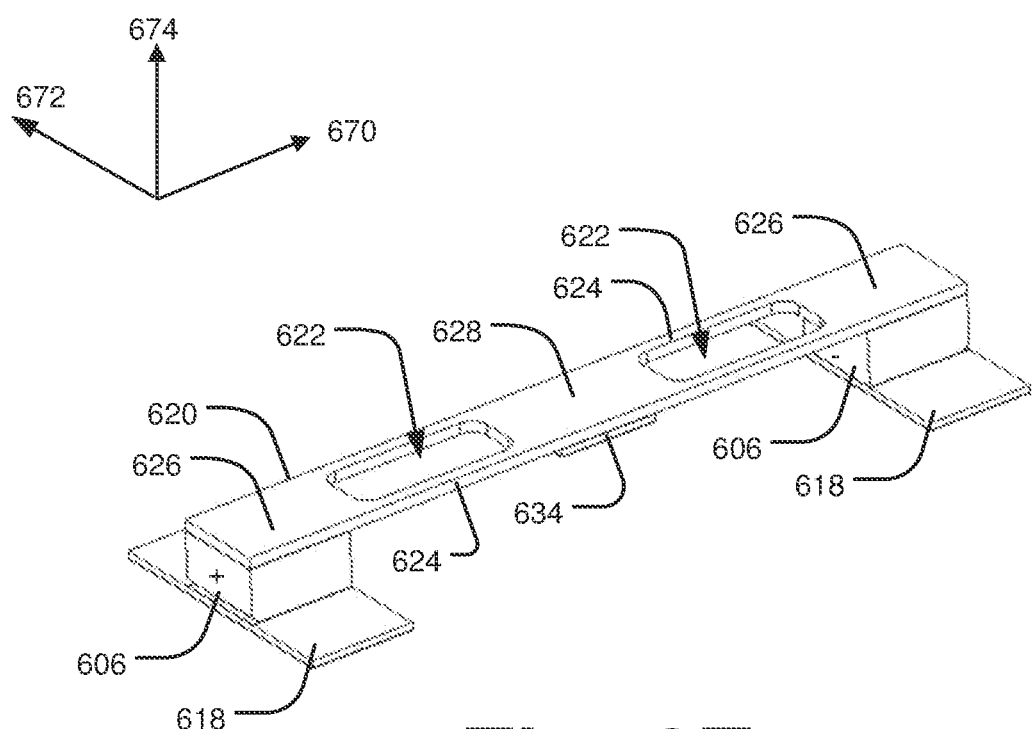
FIG. 6E is an isometric view of a suspension blade connected to a pair of sensors and insulators of the multi-axis, single mass accelerometer of FIG. 6A in isolation.
Figure 6F:
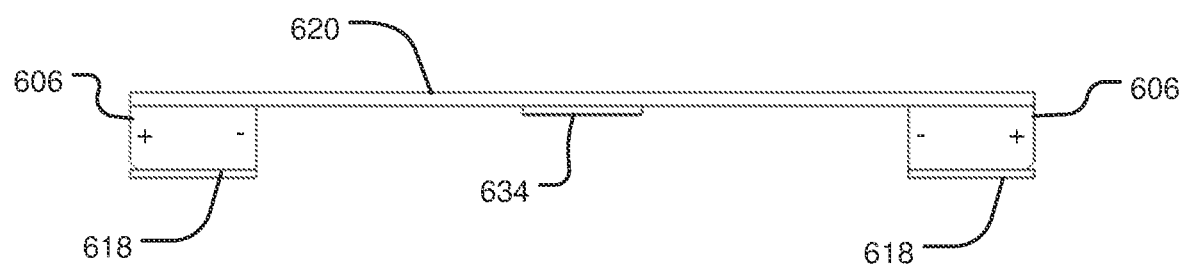
FIG. 6F is a front elevation view of the suspension blade, sensors, and insulators of FIG. 6E.

In the embodiment shown in FIGS. 6A-6D, for example, twelve (62) individual sensors 606a1-606f2 are arranged in six sets of laterally opposing pairs coupled to attachment surfaces in respective pockets 630 within the frame 608. An insulator 618, e.g., a ceramic pad, may be placed between the attachment surfaces of each of the pockets 630 and respective sensors 606a1-606f2 in order to provide electrical isolation between the sensors 606 and the frame 608. In one embodiment, the insulators 618 may be one-sided such that an outer side coupled to the sensors 606 is conductive to provide a connection for an electrical lead while the inner side connected to the attachment surfaces of the pockets 630 of the frame 608 are nonconductive. The test mass 602 is oriented within the frame 608 such that the planar coupling surfaces 604 are each respectively parallel to a respective face 610 of the frame 608 and, consequently, to a corresponding pair of pockets 630 on the respective face 610. However, as shown in FIG. 6C, the depth of each pair of pockets 630 may be greater than the depth of the coupling surfaces 604 with respect to a corresponding parallel axis A centered within the test mass 602 (i.e., one of the axes X, Y, or Z) such that a distance $D_6$ between the coupling surface 604 and the axis A is greater than a distance $D_2$ between the attachment surfaces of the pockets 630 and the axis A.

As shown in FIGS. 6A-6D, for example, twelve acceleration sensors 606a1, 606a2, 606b1, 606b2, 606c6, 606c2, 606d6, 606d2, 606e6, 606e2, 606f6, and 606f2 are affixed to laterally opposed pockets 630 on each face 610 of the frame 608, to sense translational and rotational motion of the frame 608 with respect to the test mass 602 in the three orthogonal directions defined by perpendicular axes X, Y and Z. In particular implementations, piezoelectric crystal transducers 606a1-606f2 may be used to measure the locally-defined stress response due to translation and rotation of the frame 608 about the test mass 602, e.g., in response to external torques and forces due to incident energy (e.g., physical motion, acoustic waves, seismic energy, etc.). The force transducers or acceleration sensors 606a-606f may be chosen to be highly sensitive or tuned to measure specific types or bandwidths of incident energy imparted to or experienced by the acceleration sensor in order to suitably characterize the response of the test mass 602 to the incident energy to be measured.

In such a configuration, it may be advantageous to select a piezoelectric transducer such as an acceleration sensor 606a-606f that is configured to react to shear stress on opposing sides of the piezoelectric crystal device. Suitable transducer configurations include, but are not limited to, lead magnesium niobate-lead titanate (PMN-PT) shear mode crystals (e.g., available from CTS Corporation) and piezoelectric accelerometer sensor (PAS) elements. Such a transducer registering or responsive to shear stress may provide greater sensitivity than alternatives due to the configuration of the test mass 602 within the frame 608 and the goal of measuring relative acceleration between the two. In some exemplary implementations, the transducer may be a single relaxor ferroelectric crystal, for example, a PMN-PT crystal, or other suitable transducer. The crystal responses are substantially flat with respect to frequency. This occurs because the crystal resonance is significantly out of the frequency bands of interest.

Piezoelectric elements fabricated from single crystals can exhibit superior sensing properties, relative to polycrystalline elements. Single crystal transducers can also be relatively insensitive to temperature effects, and may have high mechanical energy to electrical energy conversion factors. If a single crystal is cut transverse to the orientation of the crystal alignment, at an appropriate angle, e.g., as done by CTS Corporation in the manufacture of their <111> poled transverse shear single crystals, a transducer highly responsive to preferred shear loads and stresses (as opposed to tension or compression loads and stresses or off-axis shear loads and stresses) may be formed. In some particular embodiments, the sensors 606 may be shear-mode piezoelectric transducers, for example, oblong, rectangular, or similarly-shaped single crystal transducers with dimensions of about 3.6 mm×2 mm×6 mm. More generally, the shape and dimensions of the crystals forming the sensors 606 can vary, either individually or as a set, depending on application.

Three sets of two pairs each of piezoelectric transducer sensors 606a1-606f2 can each be mounted (e.g., using a conductive adhesive) onto one-sided insulating material previously fixed to the pockets 630 of the frame 608. Pairs of the sensors 606 on a single face 610 may be connected together and to the test mass 602 by suspension blades 620a-620f. The suspension blades 620a-620f are shown in greater detail in FIGS. 6E and 6F. Each suspension blade 620 may be formed (e.g., stamped or cut) out of a flat sheet of beryllium copper or similar material with good conductivity and a high ratio of tensile modulus to tensile yield. The suspension blades 620 may be formed as shown as elongate, rectangular blades with two apertures 622 formed therein. The apertures 622 may be oblong or elongate. The apertures 622 separate two lateral sensor contact areas 626 from a center mass coupling area 628. Each of the sensor contact areas is affixed (e.g., with conductive adhesive) to one of the sensors 606 in each pair of sensors on a face 610. The mass coupling area 628 is similarly connected to one of the coupling surfaces 604 on the test mass 602.

It may be preferable that the suspension blades 620 be electrically isolated from the test mass 602. Therefore, a rigid insulating material 634 (e.g., a ceramic pad) may be placed and adhered between the suspension blades 620 and the test mass 602. The insulating material 634 may be rigid in order to transfer energy between the frame 608 and the test mass 602 without attenuation. The sensor blades 620 are designed to be stiff or rigid along their longitudinal direction, parallel to the sensing axis 670 between each pair of sensors 606 on a respective face 610 of the frame 608. However, the suspension blades 620 are also designed to be relatively softer or less stiff along the non-sensing axes 672 and 674. This configuration results in greater response to translational forces along the sensing axes 670 of each respective sensing blade 620. This structural response is effectuated by the removal of material to form the apertures 622, leaving narrow beams 624 of material along the edges of the suspension blades 620.

The result of this design is the generation of relatively high mechanical shear stress on the sensors 606 in the principal or primary sensing direction, e.g., along the longitudinal dimension 670 of the corresponding suspension blades 620. Conversely, there may be lower shear stress in the cross-axis directions relative to the primary sensing direction, reduced by the absorption of the shear stress by the suspension blades 620 in the transverse directions. As noted above, the sensors 606 mounted between the suspension blades 620 and the frame 608 are responsive to shear stress, which manifests in a plane defined by the sensing axis 670 and the non-sensing axis 674 extending outward from a center of mass of the test mass 602 normal to the longitudinal sensing axis 670 of the respective suspension blade 620. Thus, as a force impacts the frame 608, a relative acceleration with respect to the test mass 602 arises and the crystal sensors 606 on each end of the suspension blade skew in the plane defined by axes 670, 674, which is the manufactured shear sensing plane of the crystal sensors 606, and a voltage is generated.

The configuration of the suspension blades 620 also reduces the impact of "crosstalk" from the principal sensor axis 670 to the other independent axes 672, 674. The construction of accelerometer 600 thus increases sensitivity by augmenting the effects of the crystal orientation properties of the individual sensors 606 in order to produce relatively more voltage when stressed in their preferred sensing direction, and to reduce off-axis effects in order to achieve a desired level of vector fidelity. More specifically, the accelerometer 600 is configured to generate a consistent representation of the acceleration or impulse along each independent measurement axis, regardless of sensor orientation. The accelerometer 600 is also configured to substantially reduce the response to an impulse along one particular sensor axis, as observed by the other two independent (orthogonal) axes. This improves the vector fidelity by providing a more accurate representation of the actual (physical) vector wavefield observed at the accelerometer 600, while reducing non-physical sensor response effects.

Sensor Configurations

As described above, the test mass 602 may have parallel planar coupling surfaces 604 disposed at opposite ends of the orthogonal axes X, Y, Z, and each face 610 of the frame 608 has pockets 630 positioned on lateral sides of the coupling surfaces sized to receive the sensors 606, which may be mounted therein using an adhesive or other mechanical attachment. A first pair of sensors 606a1, 606a2 (e.g., piezoelectric crystal transducers) are mounted on opposing sides of the mass 602 and spaced along the linear sense axis 670, in this case the horizontal X-axis 660, on a first face 610; and a second pair of sensors 606b1, 606b2 are mounted on opposing sides of the mass 602 and spaced along the horizontal X-axis on a second, opposing face 610. The piezoelectric crystals in each pair of sensors are mounted in opposite crystal orientations such that, for example, the positive output for shear sensitivity of the first sensor 606a1 is along the X-axis but in the opposite direction (not orthogonal) to the positive output for shear sensitivity of the second sensor 606a2. On the opposite face 610 of the frame 608, the positive output for shear sensitivity of the third sensor 606b1 is along the X-axis in the opposite direction (not orthogonal) to the positive output for shear sensitivity of the fourth sensor 606b2. In addition, the orientations of the third and fourth sensors 606b1, 606b2 are arranged parallel to and mirror the orientations of the first and second sensors 606a1, 606a2, such that the positive output of the first sensor 606a1 is in the same direction as the positive output of the third sensor 606b1, and the positive output of the second sensor 606a2 is in the same direction as the positive output of the fourth sensor 606b2. This set of four sensors 606a1-606b2 jointly create a translational accelerometer along the horizontal X-axis and a rotational accelerometer with sensitivity to rotation about the Y-axis.

A second set of sensors 606c6-606d2 may be similarly mounted on faces 610 of the frame 608 on opposing ends of the X-axis and oriented parallel to the Y-axis 662, such that the sense axis 670 of the sensors 606c6-606d2 is rotated perpendicular to that of the first set of transducers 606a1-606b2. The piezoelectric crystals in each pair of sensors are mounted in opposite crystal orientations such that, for example, the positive output for shear sensitivity of the fifth sensor 606c6 is along the Y-axis but in the opposite direction (not orthogonal) to the positive output for shear sensitivity of the sixth sensor 606c2 (not visible in figures). On the opposite face 610 of the frame 608, the positive output for shear sensitivity of the seventh sensor 606d6 is along the Y-axis in the opposite direction (not orthogonal) to the positive output for shear sensitivity of the eighth sensor 606d2. In addition, the orientations of the seventh and eighth sensors 606d6, 606d2 are arranged parallel to and mirror the orientations of the fifth and sixth sensors 606c6, 606c2, such that the positive output of the fifth sensor 606c6 is in the same direction as the positive output of the seventh sensor 606d6, and the positive output of the sixth sensor 606c2 is in the same direction as the positive output of the eighth sensor 606d2. This set of four sensors 606c6-606d2 jointly create a translational accelerometer along the Y-axis and a rotational accelerometer with sensitivity to rotation about the Z-axis.

A third set of sensors 606e6-606f2 may be mounted on faces 610 of the frame 608 on opposing ends of the Y-axis. A fifth pair of sensors 606e6, 606e2 are mounted on opposing sides of the mass 602 and spaced along the linear sense axis 670, in this case the Z-axis 664, on a fifth face 610; and a sixth pair of sensors 606f6, 606f2 are mounted on opposing sides of the mass 602 and spaced along the Z-axis on a sixth, opposing face 610. The piezoelectric crystals in each pair of sensors are mounted in opposite crystal orientations such that, for example, the positive output for shear sensitivity of the ninth sensor 606e6 is along the Z-axis but in the opposite direction (not orthogonal) to the positive output for shear sensitivity of the tenth sensor 606e2. On the opposite face 610 of the frame 608, the positive output for shear sensitivity of the eleventh sensor 606f6 is along the Z-axis in the opposite direction (not orthogonal) to the positive output for shear sensitivity of the twelfth sensor 606f2. In addition, the orientations of the eleventh and twelfth sensors 606f6, 606f2 are arranged parallel to and mirror the orientations of the ninth and tenth sensors 606e6, 606e2, such that the positive output of the ninth sensor 606e6 is in the same direction as the positive output of the eleventh sensor 606f6, and the positive output of the tenth sensor 606e2 is in the same direction as the positive output of the twelfth sensor 606f2. This set of four sensors 606e6-606f2 jointly create a translational accelerometer along the Z-axis and a rotational accelerometer with sensitivity to rotation about the X-axis. Thus, the orientation of each set of four sensors 606a1-606b2; 606c6-606d2; 606e6-606f2 may be orthogonal to that of the other sets, e.g., where the pairs of respective crystals are mounted with their sense axes 670 oriented in parallel to the X, Y, and Z axes (660, 662, and 664), respectively.

In other embodiments, the pairs of sensors 606 on each side of the mass 602 may be oriented in the same direction. In this configuration, the piezoelectric crystals in each pair of sensors are mounted in the same crystal orientations (i.e., the crystal sensitivities are oriented in the same direction) such that, for example, the positive output for shear sensitivity of each pair of sensors is along the same axis and in the same direction. The pairs of sensors 606 on opposing sides of the test mass 602 are oriented such that the sensors 606 on opposing sides along the same axis and in the same direction, i.e., they are arranged as mirror images of each other.

Sensor Response

Figure 7:
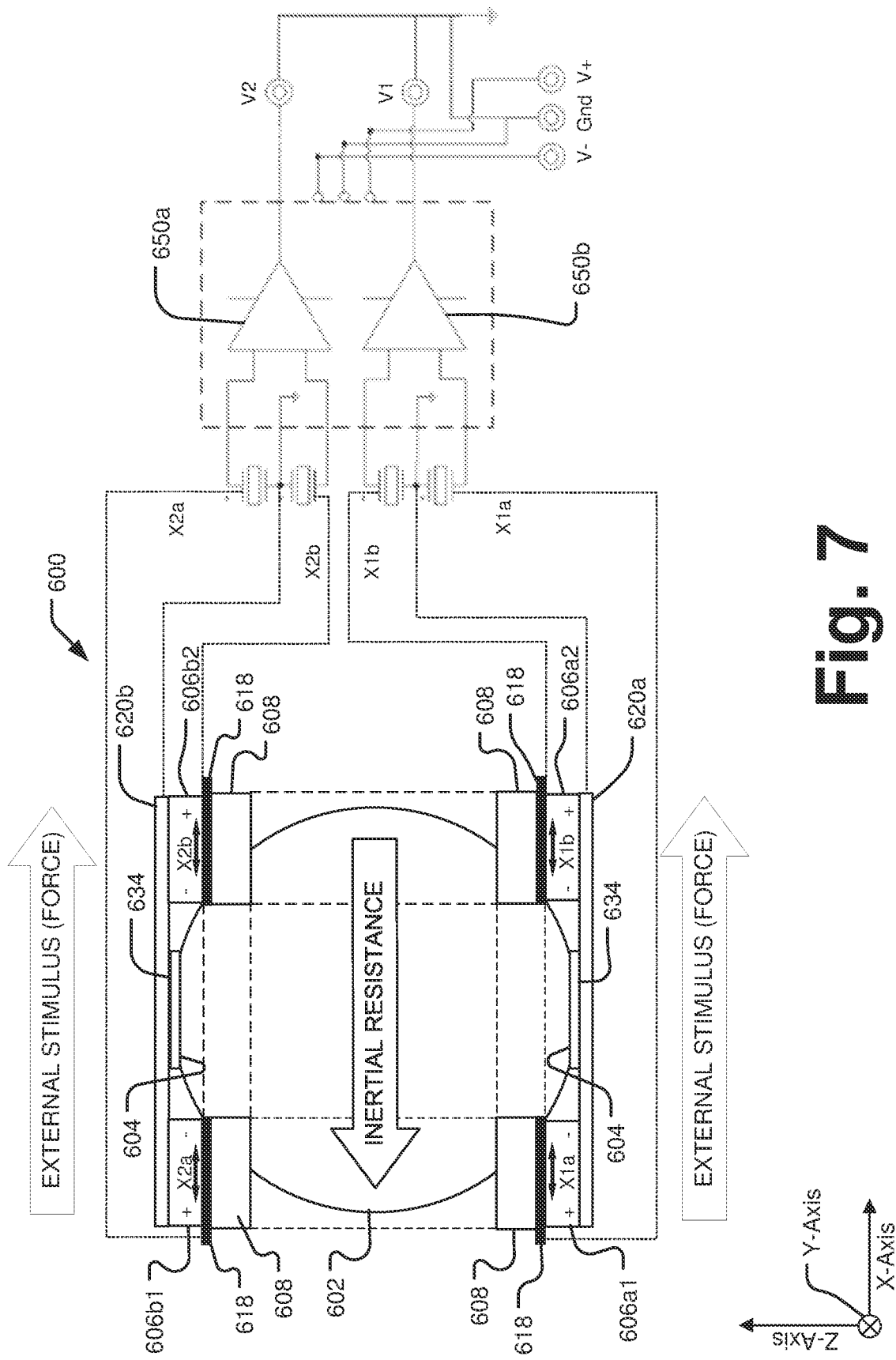
FIG. 7 is a schematic diagram illustrating a translational external stimulus force applied to a frame of a multi-axis, single mass accelerometer in the positive direction of the X-axis.

FIG. 7 is a schematic diagram illustrating an external stimulus applied to the accelerometer 600. As shown in FIG. 7, a translational external stimulus applies force to the housing or frame 608 in the positive direction of the X-axis. The individual sensors 606, e.g., piezoelectric crystal transducers, are mounted to the frame 608 with one-sided insulators 618 sandwiched in between. As shown in the schematic view of FIG. 7, the "+" and "−" symbols overlaid on each of the transducers 606a1-606b2 are indicative of the shear stress sensitivity alignment of the sensors 606 and are oriented in opposing directions for each sensor pair. They are not necessarily indicative of the location or polarity of the electrodes connected to the transducers 606. The surface or side of the insulators 618 opposite from the frame 608 and adjacent to the sensors 606 may be conductive to act as an electrode for connection of wires from processing circuitry to the sensors 606. The suspension blades 620a, 620b mechanically connect the test mass 602 to the sensors 606. The suspension blades 620a, 620b preferably are conductive and provide a ground connection to the negative electrode of the sensors 606. The suspension blades 620a, 620b are mechanically connected to the coupling surfaces 604 of the test mass 602 preferably via a rigid insulator 634 to electrically isolate the test mass 602 from the sensors 606 to reduce the potential noise source of the test mass 602.

For a translational accelerometer sensor 600, when a suitable external impulse travels along a designated positive sensing axis, the sensor 606 generates a positive (or negative/inverted) signal responsive to the resulting shear stress on the sensor 606. The inertial resistance of the test mass 602 resists the external acceleration or stimulus and a shear stress develops across each pair of sensors 606a1-606b2 positioned to respond to the external acceleration. The body of the test mass 602 and the frame 608 push and pull on the opposing faces of the sensors 606 via the suspension blades 620, generating shear stress. The sensors 606a1 and 606a2 are oriented opposite to each other in polarity of output such that when a force is applied to the accelerometer 600 in the indicated direction, the output of the first sensor 606a1 will be a positive value and the output of the second sensor 606a2 will be negative as the force is opposite the crystal orientation. Similarly, the output of the third sensor 606b1 will be a positive value and the output of the fourth sensor 606b2 will be negative. Alternatively, the sign convention may be reversed, without loss of generality. If the sensor response (piezoelectric crystal voltage output) were to merely be summed for each pair of sensors 606a1, 606a2 and 606b1, 606b2, the positive and negative values of each pair would cancel each other out and provide a voltage response of substantially zero.

However, as shown, the voltage output of the pairs of sensors 606a1, 606a2 and 606b1, 606b2 is transmitted to a pair of difference amplifiers 650a, 650b. The difference amplifiers 650a, 650b subtract the second voltage signal input from the first voltage signal input before amplification. Therefore, in view of the opposite orientation of crystal sensitivity for each pair of sensors 606a1, 606a2 and 606b1, 606b2, the result is additive. Thus, the input signal received from the sensors 606 is potentially twice the magnitude of the output from each individual crystal. As indicated in FIG. 7, each pair of sensors 606a1, 606a2 and 606b1, 606b2 generates a signal which is amplified by the difference amplifiers 650a, 650b and output as V6 and V2. These voltage outputs may be summed, taking into account DC offset removal, sensitivity corrections, and orthogonality corrections, to generate a translational acceleration response value for a particular axis.

As described above, the mechanical design of the suspension blades 620 minimizes response of the sensors 606 to off-axis forces, which further helps attenuate off-axis noise. In addition, noise attributable to off-axis force components, which manifest as common-mode signal voltage, is largely rejected and filtered from the final signal, due to the common-mode rejection filtering inherent in differential amplifiers. As an example, consider the isolated suspension blade 620 in FIG. 6E subject to pure translational acceleration in direction 674. The acceleration of the frame 608 to which the suspension blade is mounted is in a direction 674 normal to the length of the suspension blade 620, which extends in direction 670. Even though the openings 622 in the suspension blade 620 limit the stiffness of the suspension blade 620 perpendicular to direction 670 (in order to maximize crystal response to motion in direction 670), some tension occurs against the crystals attached to the suspension blade 620 as the test mass 602 moves inward or outward in response to movement of the frame 608 in direction 674. The charge/voltage response of the two crystal sensors 606 of the suspension blade 620 to this motion is of the same polarity, though, and is effectively rejected by the common-mode rejection of the difference mode amplifiers 650a, 650b. Similarly, for a rotation of the frame 608 around the test mass 602 about an axis parallel to direction 674, the force induced on the suspension blade 620 causes tension against the crystals 606, again causing a common-mode signal rejected by the difference mode amplifier 650a, 650b. The overall effect of the dual crystal/difference mode amplifier is to further reject unwanted signals (contamination) in the longitudinal axis direction 670 from translational motion in the perpendicular axes, directions 672 and 674, and from rotational motion about directions 670 and 674, promoting high-fidelity transduction.

As noted above, in an alternative embodiment, when the pairs of piezoelectric crystal sensors 606 are aligned in the same orientation, the output of the pairs of sensors may be transmitted in parallel to a corresponding circuit for filtering and amplification. A person of skill in the art will understand this alternate wiring arrangement of the sensors and it is thus not described in further detail here. Notably, in this arrangement, the input charge received from each pair of sensors 606 aligned on one side of the test mass 602 is potentially twice the magnitude of the output from each individual crystal. In yet a further embodiment, each sensor 606 about the test mass 602 may be wired individually and directly to a corresponding amplifier within a sensing circuit. In such a configuration, the sensors 606 may be electrically insulated from the suspension blades 620 in addition to the test mass 602 by placing additional insulating pads between the sensors 606 and the suspension blades 620. Again, a person of skill in the art will understand this alternate configuration and wiring arrangement of the sensors and it is thus not described in further detail here. Each of these wiring configurations may provide unique advantages that may be preferable depending upon the output data desired.

Rotational Response

The three sensor axes X, Y, Z may be orthogonally arranged, e.g., with the positive polarity orientation of each axis satisfying the right-hand rule (see FIG. 7). For a rotational acceleration sensor, a coupled set of pairs of piezoelectric crystal transducers 606 as disclosed herein will generate voltage of a positive polarity for acceleration in a clockwise direction around their common axis, viewed through the plane of the motion and along the positive axis normal to the plane. Described another way, looking down from the positive end of the axis normal to the plane of rotation, acceleration of a coupled set of pairs of sensors in a counter-clockwise direction around the axis will generate voltage of a positive polarity. Alternatively, the sign convention may be reversed, without loss of generality. From the same sensors that measure translation acceleration along the X-axis, rotational acceleration may be calculated for rotational movement about the Y-axis. From the same sensors that measure translation acceleration along the Y-axis, rotational acceleration may be calculated for rotational movement about the Z-axis. And from the same sensors that measure translation acceleration along the Z-axis, rotational acceleration may be calculated for rotational movement about the X-axis.

CONCLUSION

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the structures disclosed herein, and do not create limitations, particularly as to the position, orientation, or use of such structures. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

The above specification, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A seismic sensor system comprising:
   a sensor node further comprising:
      a first sensor capable of sensing seismic pressure waves; and
      a second sensor capable of sensing motion of the sensor node in one or more dimensions;
   a negatively buoyant ocean bottom anchor; and
   a tether connecting the sensor node to the anchor at a separation distance from the anchor, wherein a buoyancy of the sensor node is set to minimize tension of the tether, wherein the tether comprises:
      a first section connected to the sensor node that has greater density than a density of a medium,
      a second section connected to the anchor that has a lesser density than the density of the medium; and
      a third section between the first section and the second section that has a density substantially congruent with the density of the medium.

2. The seismic sensor system of claim 1, wherein the negatively buoyant ocean bottom anchor is connected to an ocean bottom cable.

3. The seismic sensor system of claim 2 further comprising a plurality of the sensor nodes connected to the ocean bottom cable by a respective plurality of the tethers at distributed locations along the ocean bottom cable.

4. The seismic sensor system of claim 1, wherein the sensor node is formed as a spherical body made of a material of uniform density encapsulating the first sensor, the second sensor, computer circuitry, memory, and a power source such that the sensor node is substantially solid.

5. The seismic sensor system of claim 4 further comprising an inclinometer within the sensor node connected with the computer circuitry and the memory, wherein data output from the inclinometer, along with the sensed motion, is processed to determine a waterborne particle velocity.

6. The seismic sensor system of claim 1, wherein the first sensor is a hydrophone.

7. The seismic sensor system of claim 1, wherein the second sensor is a single mass accelerometer and wherein the sensor node comprises:
   computer circuitry for processing motion data output from the second sensor to compute a waterborne particle velocity;
   a memory for recording data including the seismic pressure waves, the sensed motion, and the computed waterborne particle velocity; and
   a power source.

8. The seismic sensor system of claim 1, wherein the tether forms a Z-bend with two inflection points.

9. The seismic sensor system of claim 8, wherein the Z-bend is formed entirely within the third section.

10. The seismic sensor system of claim 8, wherein a measurable tension on the tether at each of the inflection points is constantly substantially zero.

11. The seismic sensor system of claim 1, wherein the tether comprises:
    a load bearing sheath defining a conduit therein; and
    an inner elastic cord positioned coaxially within the conduit.

12. The seismic sensor system of claim 11, wherein when the sheath is under compression, no load or torque is transferred by the sheath between the anchor and the sensor node.

13. A seismic sensor system comprising:
    a sensor node further comprising:
       a first sensor capable of sensing seismic pressure waves; and
       a second sensor capable of sensing motion of the sensor node in one or more dimensions;
    a negatively buoyant ocean bottom anchor; and
    a tether connecting the sensor node to the anchor at a separation distance from the anchor, wherein a buoyancy of the sensor node is set to minimize tension of the tether, wherein the tether comprises:
       a load bearing sheath defining a conduit therein; and
       an inner elastic cord positioned coaxially within the conduit.

14. The seismic sensor system of claim 13, wherein when the sheath is under compression, no load or torque is transferred by the sheath between the anchor and the sensor node.

15. The seismic sensor system of claim 13, wherein the negatively buoyant ocean bottom anchor is connected to an ocean bottom cable.

16. The seismic sensor system of claim 15 further comprising a plurality of the sensor nodes connected to the ocean bottom cable by a respective plurality of the tethers at distributed locations along the ocean bottom cable.

17. The seismic sensor system of claim 13, wherein the sensor node is formed as a spherical body made of a material of uniform density encapsulating the first sensor, the second sensor, computer circuitry, memory, and a power source such that the sensor node is substantially solid.

18. A seismic sensor system comprising:
    a sensor node further comprising:
       a first sensor capable of sensing seismic pressure waves; and
       a second sensor capable of sensing motion of the sensor node in one or more dimensions;
    a negatively buoyant ocean bottom anchor; and
    a tether connecting the sensor node to the anchor at a separation distance from the anchor, wherein a buoyancy of the sensor node is set to minimize tension of the tether, wherein the tether has a varying density along its length.

19. The seismic sensor system of claim 18, wherein the negatively buoyant ocean bottom anchor is connected to an ocean bottom cable.

20. The seismic sensor system of claim 19 further comprising a plurality of the sensor nodes connected to the ocean bottom cable by a respective plurality of the tethers at distributed locations along the ocean bottom cable.

21. The seismic sensor system of claim 18, wherein the sensor node is formed as a spherical body made of a material of uniform density encapsulating the first sensor, the second sensor, computer circuitry, memory, and a power source such that the sensor node is substantially solid.

22. The seismic sensor system of claim 21 further comprising an inclinometer within the sensor node connected with the computer circuitry and the memory, wherein data output from the inclinometer, along with the sensed motion, is processed to determine a waterborne particle velocity.

23. The seismic sensor system of claim 18, wherein the first sensor is a hydrophone.

24. The seismic sensor system of claim 18, wherein the second sensor is a single mass accelerometer and wherein the sensor node comprises:
- computer circuitry for processing motion data output from the second sensor to compute a waterborne particle velocity;
- a memory for recording data including the seismic pressure waves, the sensed motion, and the computed waterborne particle velocity; and
- a power source.

25. The seismic sensor system of claim 18, wherein the tether comprises:
- a first section connected to the sensor node that has greater density than a density of a medium;
- a second section connected to the anchor that has a lesser density than the density of the medium; and
- a third section extending between the first section and the second section that has a density substantially congruent with the density of the medium.

26. The seismic sensor system of claim 25, wherein the tether forms a Z-bend with two inflection points.

27. The seismic sensor system of claim 26, wherein the Z-bend is formed entirely within the third section.

28. The seismic sensor system of claim 26, wherein a measurable tension on the tether at each of the inflection points is constantly substantially zero.

* * * * *